(12) United States Patent
Choi et al.

(10) Patent No.: US 10,490,793 B2
(45) Date of Patent: Nov. 26, 2019

(54) PORELESS SEPARATOR FOR LITHIUM AIR BATTERY

(71) Applicant: KOREA ADVANCED INSTITUTE OF SCIENCE AND TECHNOLOGY, Daejeon (KR)

(72) Inventors: Jang Wook Choi, Daejeon (KR); Byung Gon Kim, Busan (KR); Joo Seong Kim, Yongin-si (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 52 days.

(21) Appl. No.: 15/170,536

(22) Filed: Jun. 1, 2016

(65) Prior Publication Data
US 2017/0162847 A1    Jun. 8, 2017

(30) Foreign Application Priority Data

Dec. 8, 2015  (KR) .................. 10-2015-0174366

(51) Int. Cl.
| | | |
|---|---|---|
| *H01M 12/08* | (2006.01) | |
| *H01M 2/16* | (2006.01) | |
| *H01M 10/0525* | (2010.01) | |
| *H01M 10/42* | (2006.01) | |

(52) U.S. Cl.
CPC ..... *H01M 2/1653* (2013.01); *H01M 10/0525* (2013.01); *H01M 10/4235* (2013.01); *H01M 12/08* (2013.01); *H01M 2220/20* (2013.01); *Y02E 60/122* (2013.01); *Y02E 60/128* (2013.01)

(58) Field of Classification Search
None
See application file for complete search history.

(56) References Cited

U.S. PATENT DOCUMENTS

| | | | | |
|---|---|---|---|---|
| 5,346,788 A | * | 9/1994 | Chang ..................... | H01M 2/14 429/249 |
| 6,949,285 B1 | * | 9/2005 | Tobinaga ............. | B01D 69/148 428/317.9 |
| 8,748,043 B2 | * | 6/2014 | Mikhaylik ............ | H01M 4/382 429/307 |
| 2011/0300450 A1 | * | 12/2011 | Balaji ................. | H01M 10/052 429/303 |
| 2014/0287323 A1 | * | 9/2014 | Lu ....................... | H01M 2/1653 429/303 |
| 2016/0133949 A1 | * | 5/2016 | Madabusi ............. | H01M 2/145 429/508 |

OTHER PUBLICATIONS

Joo-Seong Kim et al., "Poreless Separator and Electrolyte Additive for Lithium-Sulfur Batteries with High Areal Energy Densities", *ChemNanoMat 2015*, 1, pp. 240-245, Jun. 22, 2015.

Byung Gon Kim et al., A Moisture- and Oxygen-Impermeable Separator for Aprotic Li—$O_2$ Batteries, *Adv. Funct. Mater. 2016*, 26, pp. 1747-1756, Feb. 3, 2016.

* cited by examiner

*Primary Examiner* — Tracy M Dove
(74) *Attorney, Agent, or Firm* — NSIP Law

(57) ABSTRACT

Disclosed is a separator for a lithium battery, which includes a first polymer and a second polymer, has an interchain distance of 2.8 Å or less, and is free from pores, wherein the second polymer has higher polarity than the first polymer.

4 Claims, 23 Drawing Sheets

PORELESS SEPARATOR FOR LITHIUM AIR BATTERY

CROSS-REFERENCE TO RELATED APPLICATION

This application claims priority of Korean Patent Application No. 10-2015-0174366, filed on Dec. 8, 2015, in the KIPO (Korean Intellectual Property Office), the disclosure of which is incorporated herein entirely by reference.

BACKGROUND OF THE INVENTION

Field of the Invention

The present disclosure relates to a separator for a nonporous lithium battery and a lithium battery including the same. More particularly, the present disclosure relates to a separator for a nonporous lithium battery, which can prevent permeation of moisture and oxygen, even though a large amount of electrolyte taken through an interchain space accelerates diffusion of lithium ions, as well as a lithium battery including the same.

Description of the Related Art A lithium-oxygen (Li—$O_2$) battery has been given many attentions by virtue of its energy density 3-5 times higher than the energy density of a conventional lithium ion battery. This provides an advantage in that such a Li—$O_2$ battery can extend the mileage of an electric vehicle upon each time of charging. It is very important to apply Li—$O_2$ batteries successfully to electric vehicles.

Even though such a lithium-oxygen battery has high energy storage capacity, it is limited in cycle characteristics due to the partial irreversibility of a cathode, evaporation of electrolyte, unstable lithium metal interface caused by inevitable oxygen permeation into an anode, or the like.

Therefore, in order to solve the related problems caused by all of the battery elements, an approach to solve the problems in a systematic view is required. However, many related studies have focused on improvement of the reversibility of an air-cathode through the development of a high-efficiency catalyst and development of an electrode backbone and electrolyte.

Although such studies have improved cycle characteristics significantly, lithium metal stability during operation is still problematic and durability caused by inevitable contact with oxygen and moisture is also problematic. While electrolyte decomposition is carried out, water is produced from the reaction between a binder (poly(vinylidene fluoride)) and the intermediate ($LiO_2$) of the main reaction, and the produced water causes production of lithium hydroxide (LiOH) on the lithium metal surface.

In addition, the other byproducts, such as $Li_2CO_3$ and $ROCO_2Li$, may be formed on the lithium metal surface from the reaction between reduced electrolyte and oxygen. In fact, stabilizing the lithium metal surface is more difficult than solving the problem of reversibility of a cathode. This is because lithium metal is very sensitive to moisture and oxygen, and it is difficult to remove moisture and oxygen completely due to the open structure of a cathode.

To solve the above-mentioned problem, there have been some attempts to coat lithium metal with a ceramic/polymer protective film or to use a substitute anode material. However, such attempts cannot be fundamental solutions for the above-mentioned problem, because a protective film cannot survive continuously during cycles and use of a substitute anode material interrupts the advantages of a lithium-oxygen battery.

In addition, a lithium-sulfur battery has been given many attentions by virtue of its high capacity but has a difficulty in commercialization due to dissolution of polysulfides. Lithium polysulfides ($Li_2S_x$, $4 \leq x \leq 8$) with a long chain length generated upon the first discharge are dissolved into most water-insoluble electrolytes and diffused into a lithium anode. During this, the active material of a sulfur electrode is lost continuously and the interface of a lithium electrode becomes unstable due to the reaction in which lithium polysulfides participate. As a result, the battery undergoes degradation of coulombic efficiency (CE) during repeated cycles.

One of the methods for preventing such fatal lithium polysulfide dissolution is interrupting diffusion of lithium polysulfides while accelerating diffusion of lithium ions. Therefore, it is important to provide a separator that can accept lithium ions while interrupting diffusion of lithium polysulfides. There is a need for a separator capable of solving the problem of lithium dendrite growth that causes degradation of cycle characteristics.

Under these circumstances, there is an imminent need for developing a novel separator capable of solving the above-mentioned problems.

SUMMARY OF THE INVENTION

A technical problem to be solved by the present disclosure is to provide a system and method for protecting lithium metal as an anode of a lithium-oxygen battery, lithium-sulfer battery, or lithium ion battery effectively.

The nonporous polyurethane separator according to the present disclosure prevents permeation of moisture and oxygen, even though a large amount of electrolyte taken through an interchain space accelerates diffusion of lithium ions.

By virtue of high stability at the lithium metal interface, the battery using the nonporous polyurethane separator according to the present disclosure shows significantly improved cycle characteristics and a constant capacity of 600 mAh $g^{-1}$ even at the $200^{th}$ cycle or higher. In addition, the nonporous polyurethane separator according to the present disclosure protects a lithium metal anode from lithium iodide (LiI) used as a redox medium in electrolyte to improve the reversibility of cathode reaction. Further, the separator according to the present disclosure may be applied to lithium ion batteries as well as lithium-oxygen batteries.

Additionally, the separator according to the present disclosure allows permeation of lithium ions while effectively interrupting polysulfide ions in a lithium-sulfur battery, and thus can significantly improve the cycle characteristics of a lithium-sulfur battery.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

To solve the above-mentioned problems, the present disclosure is focused on a lithium anode interface susceptible to moisture and oxygen transferred from a cathode. Thus, there is provided a nonporous (poreless) polyurethane (PU) separator to overcome the problems.

Figure 1:
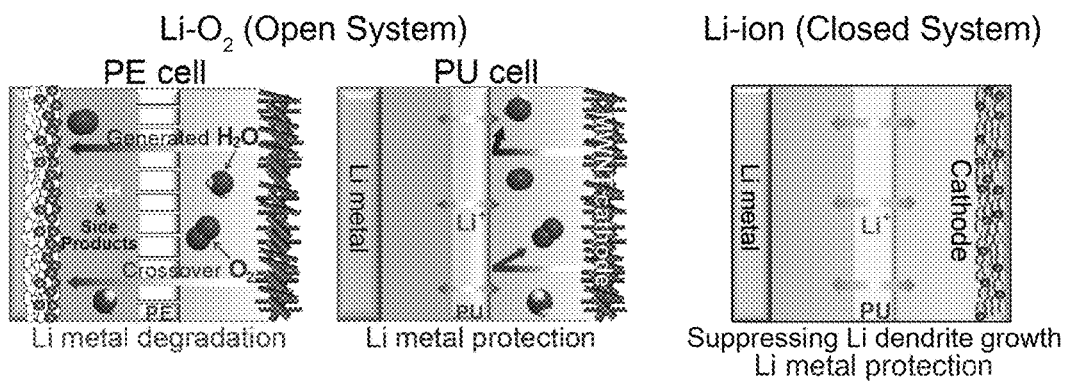
FIG. 1 shows a schematic view illustrating comparison of a conventional polyolefin porous polyethylene (PE) separator with the nonporous polyurethane (PU) separator according to the present disclosure in a lithium-oxygen battery, and a schematic view illustrating application of a polyurethane separator to a lithium ion battery.

FIG. 1 shows a schematic view illustrating comparison of a conventional polyolefin porous polyethylene (PE) separator with the nonporous polyurethane (PU) separator according to the present disclosure in a lithium-oxygen battery, and a schematic view illustrating application of a polyurethane separator to a lithium ion battery.

Referring to FIG. 1, the nonporous polyurethane separator prevents permeation of moisture and oxygen, even though diffusion of lithium ions is accelerated by a large amount of electrolyte taken through the interchain space. In addition, by virtue of the nonporous characteristics, the polyurethane separator may inhibit growth of lithium metal dendrite.

By virtue of such improved stability at the lithium metal interface, the battery using the nonporous polyurethane separator according to an embodiment shows significantly improved cycle characteristics and provides a constant capacity of 600 mAhg$^{-1}$ even at the 200$^{th}$ cycle or higher cycle. Further, the nonporous polyurethane separator according to an embodiment protects a lithium metal anode from lithium iodide (LiI) used to improve the reversibility of cathode reaction as a redox medium in the electrolyte.

The following test examples show that the instability of a lithium metal anode under most driving conditions more adversely affects the cycle characteristics as compared to low reversibility of cathode reaction.

A separator for a lithium oxygen battery has been mostly directed to developing a separator capable of being impregnated with a large amount of electrolyte, like a widely used glass fiber film. However, since most currently used separators are porous, oxygen and moisture passing therethrough arrive at the lithium metal anode. On the contrary, according to an embodiment, a nonporous separator is used to allow transfer of lithium ions selectively while preventing such permeation of oxygen and water. At the same time, it is possible to inhibit growth of lithium metal dendrite.

In this context, the present inventors have taken notice of the low gas permeability of a rubber-based material, such as styrene-butadiene rubber (SBR), polyisobutylene, polyisoprene and polyurethane.

Such low gas permeability derived from high chain packing density is a main cause of the use of such a type of rubber as a sealant. Not only gas permeability but also polarity should be considered in view of the compatibility with electrolyte. Considering all of the above, the present disclosure provides polyurethane as a nonporous separator material in one aspect. This is because polyurethane can be bound with a large amount of polar functional groups despite its high chain packing density. However, it is possible to use a polyurethane-, polystyrene-, polyolefin-, polyuria-, polyamide-, polyether-, or polyester-based polymer as a nonporous separator material. The material includes a first polymer and a second polymer, wherein the second polymer has higher polarity than the first polymer to increase lithium ion permeability and wettability, and has an interchain distance of 2.8 Å or less so that water and oxygen may not permeate therethrough. As long as the material is nonporous, it is within the scope of the present disclosure.

According to an embodiment, the polyurethane separator is obtained from 4,4-diphenylmethane diisocyanate (MDI), polytetramethylene glycol (PTMEG), and polyethylene oxide (PEO) according to the conventional method. First, 0.12 mM of MDI, PTMEG, and PEO are dissolved into dimethyl formamide (DMF) at a molar ratio of 4:1:1, followed by mixing. To form prepolymer emulsion, the resultant mixture is agitated at 80° C. for 5 hours and 0.06 mM of 1,4-butanediol is added thereto. Then, the emulsion is agitated to carry out polymerization further, is cast onto a release paper substrate, and then is dried. After that, the dried polymer film is immersed in water for 2 hours to substitute DMF with water, and the release paper substrate is removed to obtain a finished polyurethane separator.

Figure 2:
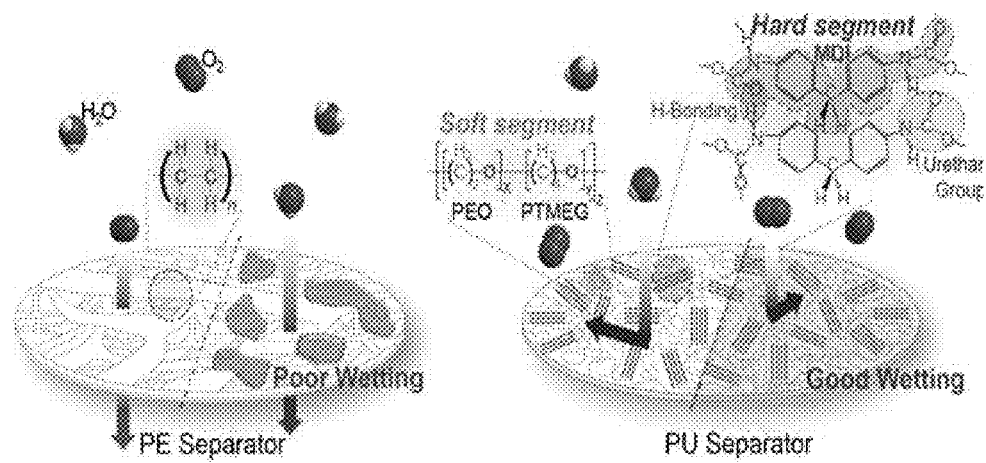
FIG. 2 is a schematic view illustrating the effect of a separator depending on gas/water permeation and wetting with electrolyte according to an embodiment.

FIG. 2 is a schematic view illustrating the effect of a separator depending on gas/water permeation and wetting with electrolyte according to an embodiment, wherein the left side shows a conventional polyethylene separator and the right side shows the nonporous polyurethane separator according to the present disclosure.

Referring to FIG. 2, like the other polyurethane polymer, the polyurethane obtained according to an embodiment of the present disclosure has a hard segment and a soft segment (a first polymer and a second polymer). The hard segment (first polymer) includes MDI units and interacts with the adjacent polymer units through π-π interaction and hydrogen bonding between urethane terminal groups. By virtue of such interchain interaction, the polyurethane according to the present disclosure shows improved mechanical strength and elasticity. On the contrary, the soft segment (second polymer) has higher polarity than the first polymer and includes PEO and PTMEG according to an embodiment. The second polymer having higher polarity provides the nonporous polyurethane according to the present disclosure with suitable softness and wettability with electrolyte.

Particularly, it is possible to control the polarity of polyurethane through PEO contained in the second polymer as a soft segment. In other words, the reason why PEO is selected as a soft segment unit according to an embodiment is that PEO is a material known as a gel polymer electrolyte and has polarity equivalent to the polarity of a conventional electrolyte for a battery. Such a suitable level of polarity advantageously improves the wettability with electrolyte and diffusion of lithium ions through a polyurethane film.

Figure 3:
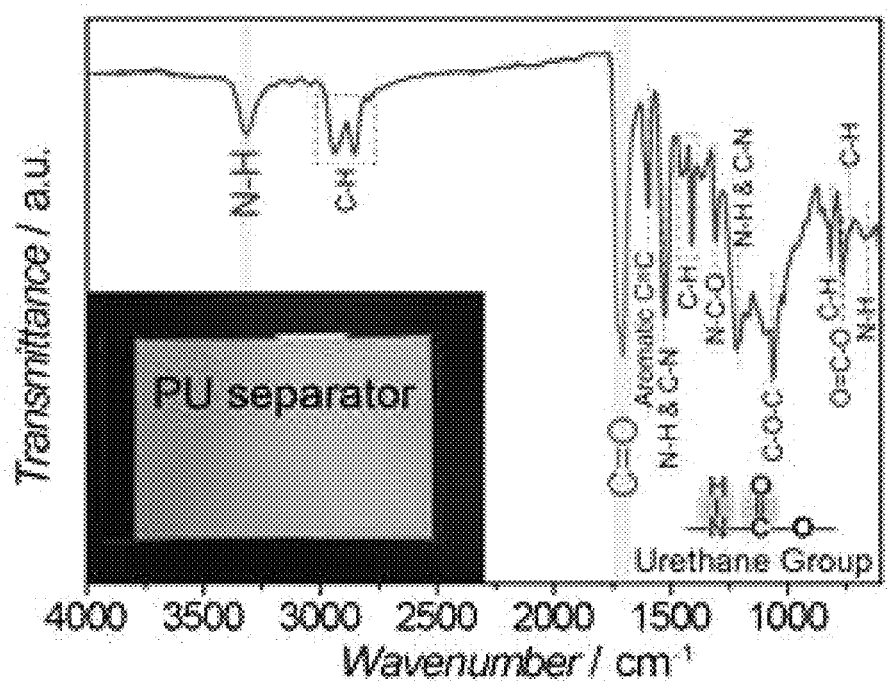
FIG. 3 shows the results of structural characteristics of polyurethane as determined by Fourier transform infrared spectroscopy (FT-IR).

FIG. 3 shows the results of structural characteristics of polyurethane as determined by Fourier transform infrared spectroscopy (FT-IR).

Referring to FIG. 3, the polyurethane separator obtained according to the present disclosure shows two specific characteristic peaks at 3330 cm$^{-1}$ and 1730 cm$^{-1}$ and the peaks correspond to N—H and C═O bonds, which are urethane groups of the hard segment.

Main characteristics of a polyurethane (PU) separator are compared with a porous polyethylene (PE) separator according to the related art.

Figure 4:
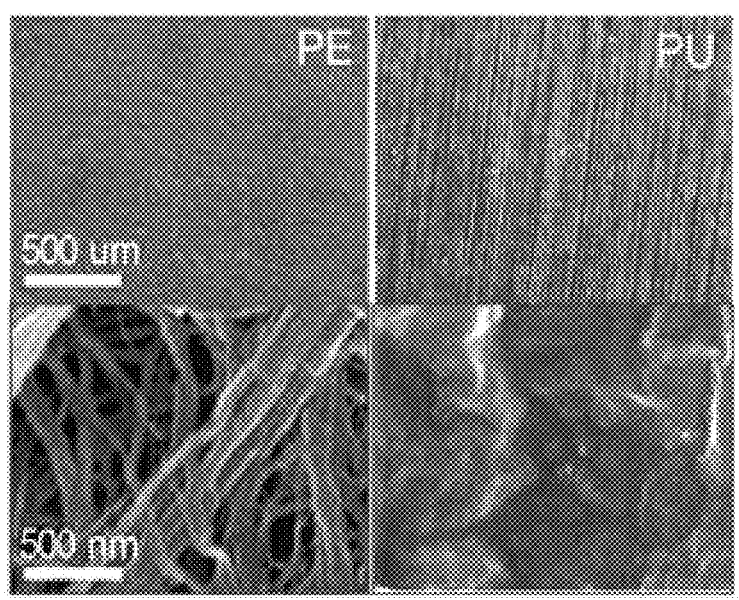
FIG. 4 is a scanning electron microscopic (SEM) image showing the nonporous polyurethane (PU) separator according to the present disclosure and a porous polyethylene (PE) separator.

FIG. 4 is a scanning electron microscopic (SEM) image showing the nonporous polyurethane (PU) separator according to the present disclosure and a porous polyethylene (PE) separator.

Referring to FIG. 4, the two types of separators show a significant difference at the same magnification. The porous polyethylene (PE) separator according to the related art has many pores having a diameter of 150-250 nm, while the polyurethane (PU) separator according to the present disclosure shows no pore even in the image taken at a high magnification. It can be seen from the above results that the polyurethane separator according to the present disclosure has no pores, and thus is a so-called nonporous separator.

Figure 5:
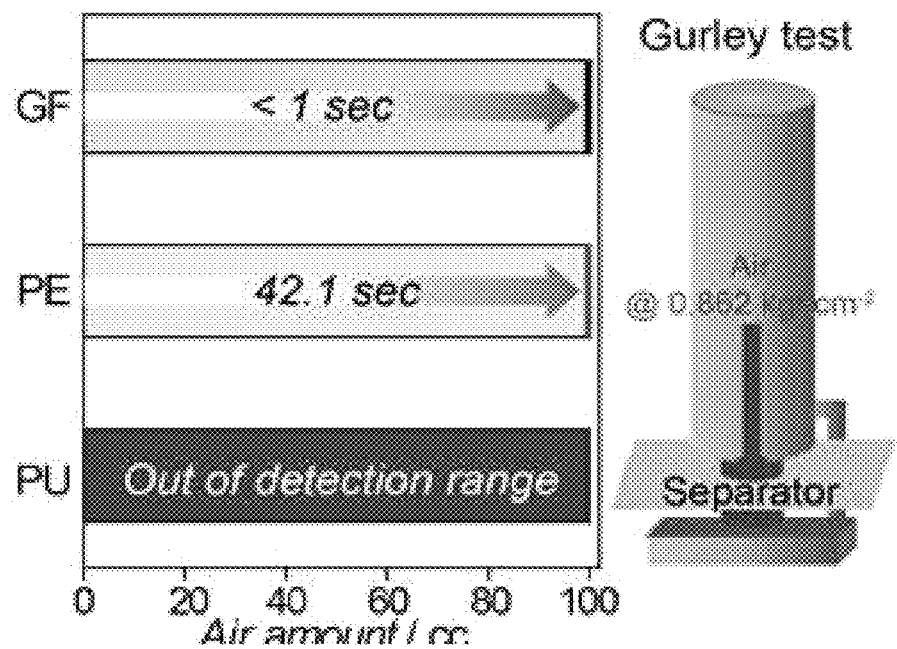
FIG. 5 shows the results of porosity analysis as determined in terms of Gurley time in an air permeation test.

FIG. 5 shows the results of porosity analysis as determined in terms of Gurley time in an air permeation test. Herein, Gurley time means the time required for 100 cm$^3$ of air to permeate through a separator under a pneumatic pressure of 0.862 kgf cm$^{-2}$.

Referring to FIG. 5, the polyethylene separator and the glass fiber separator show a Gurley time of 42.1 seconds and <1 second, respectively, while the nonporous polyurethane separator according to the present disclosure is not within the detectable region. This suggests that the nonporous polyurethane separator according to the present disclosure is perfectly impermeable to air, and the same is also applied to electrolyte.

Figure 6:
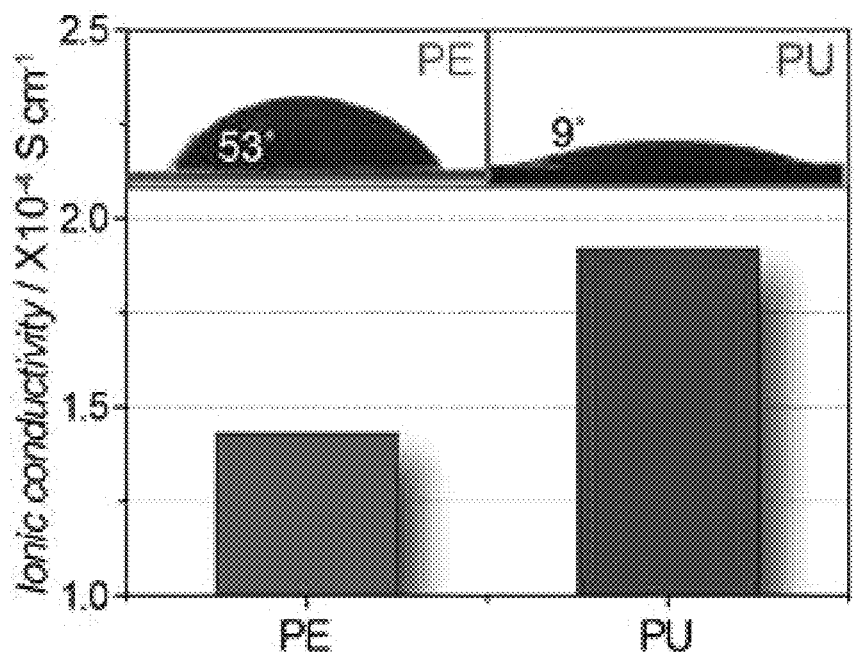
FIG. 6 shows the results of ion conductivity analysis.

However, although the nonporous polyurethane separator according to the present disclosure is impermeable to air and electrolyte, it has excellent lithium ion transportability as can be seen from the ion conductivity analysis results of FIG. 6.

Referring to FIG. 6, the nonporous polyurethane separator according to the present disclosure shows an ion conductivity improved by 1.34 times as compared to a porous polyethylene separator impregnated with electrolyte. Such high ion conductivity is derived from the excellent wettability of the nonporous polyurethane separator according to the present disclosure with electrolyte. In the polyurethane separator wetted with tetraethylene glycol dimethyl ether electrolyte containing 1M $LiClO_4$ dissolved therein, the separator is wetted with electrolyte through the interchain space of polyurethane due to the hydrophilic reaction between the polar functional groups, including urethane and ether, and electrolyte.

Although the electrolyte infiltrates through the interchain space, oxygen and water are too large to pass through the same interchain space, and thus cannot pass through the separator. In other words, the separator according to the present disclosure has an interchain distance of 2.8 Å or less, for example 0.1-2.8 Å. Thus, water and air cannot permeate the separator through the interchain distance as well as the pores. This is because oxygen and water have a size of 3.46 Å and 2.8 Å, respectively.

Figure 7:
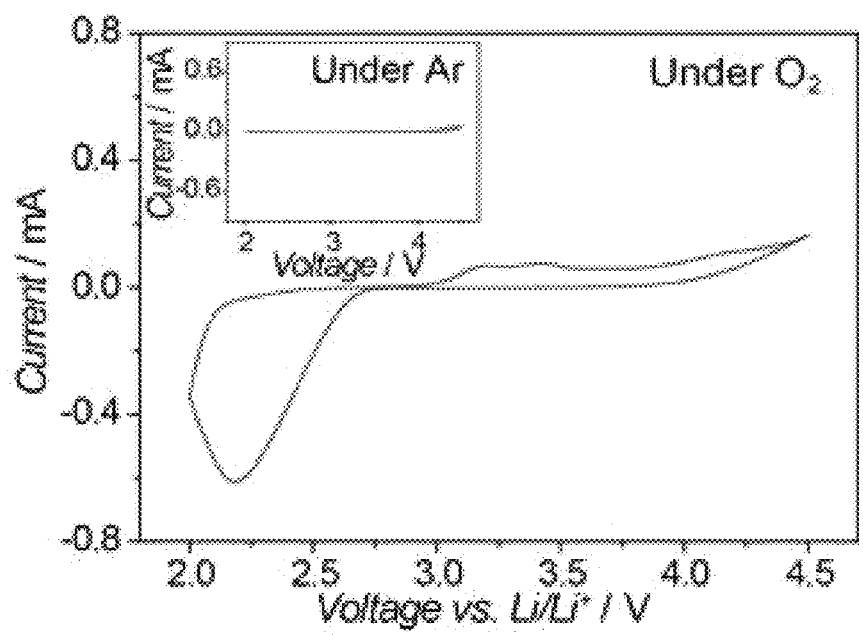
FIG. 7 shows the CV (cyclic voltammetry) profile of the battery including the separator according to the present disclosure.
Figure 8:
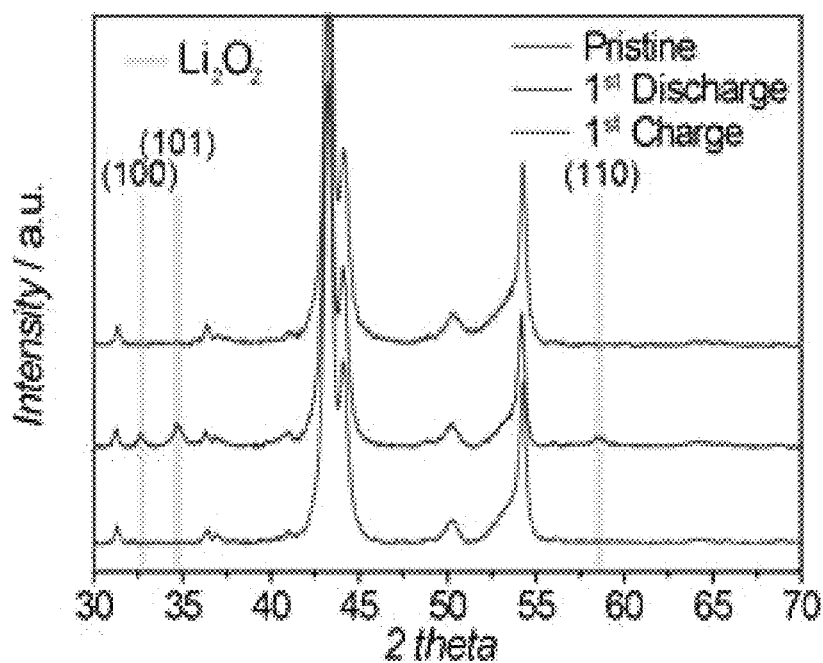
FIG. 8 shows the results of XRD (X-ray diffractometry) analysis of a cathode.
Figure 9:
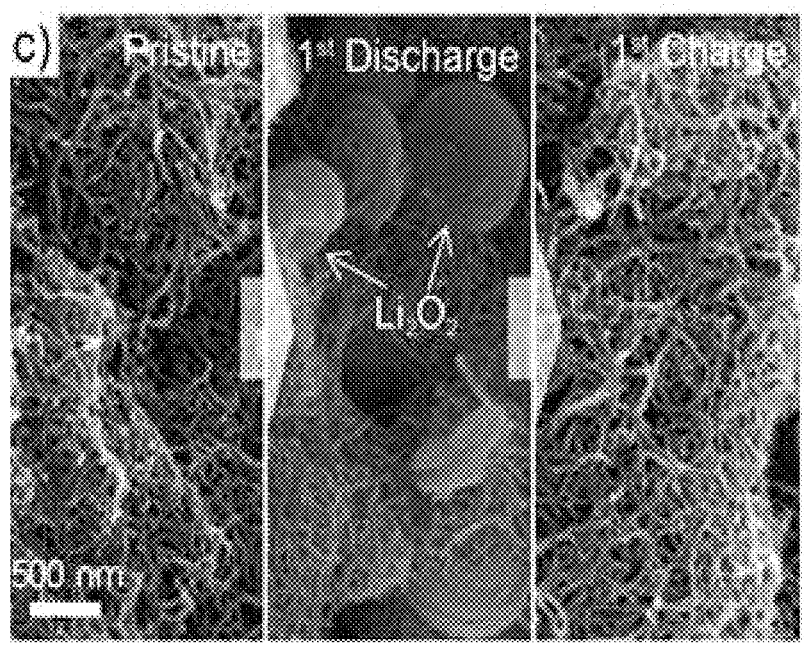
FIG. 9 shows the SEM image of a cathode in the initial state (Pristine), and upon the first discharge and the first charge.
Figure 10:
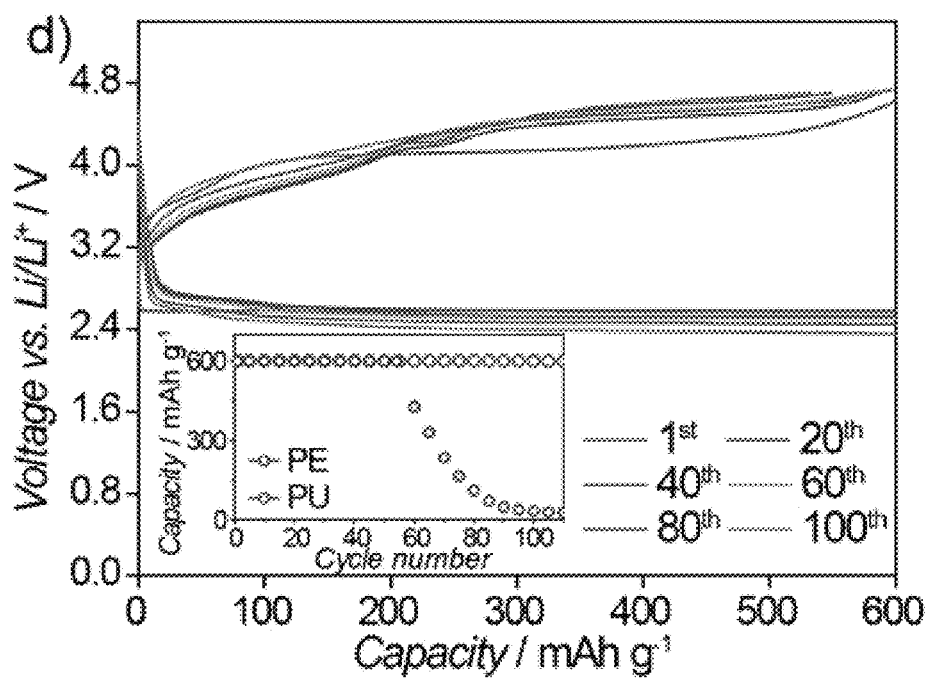
FIG. 10 shows the results of analysis of the voltage profile and cycle characteristics of the battery including the nonporous polyurethane separator according to the present disclosure.
Figure 11:
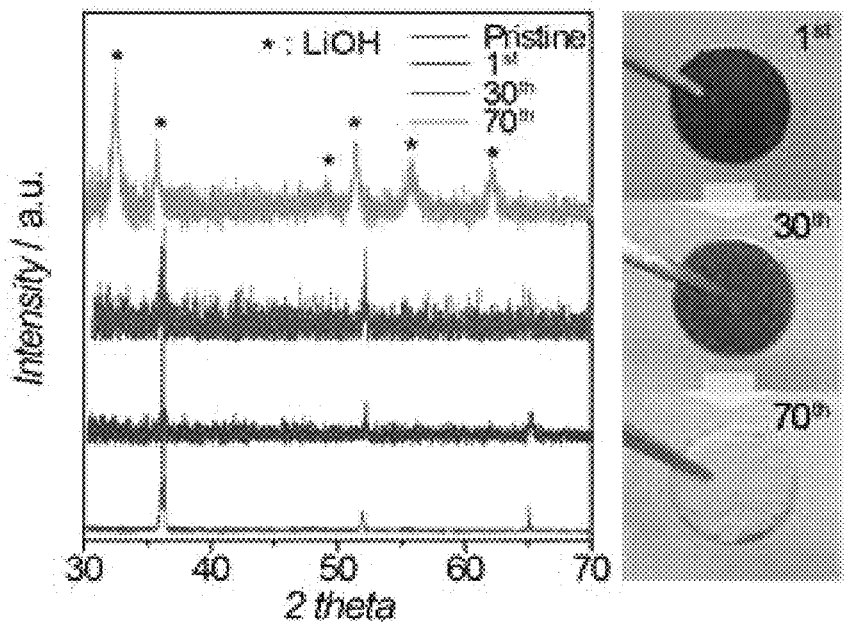
FIG. 11 through FIG. 16 show the results of analysis about the effect of the polyurethane separator upon protection of lithium metal.

FIG. 7 shows the CV (cyclic voltammetry) profile of the battery including the separator according to the present disclosure, FIG. 8 shows the results of XRD (X-ray diffractometry) analysis of a cathode, FIG. 9 shows the SEM image of a cathode in the initial state (pristine), and upon the first discharge and the first charge, and FIG. 10 shows the results of analysis of the voltage profile and cycle characteristics of the battery including the nonporous polyurethane separator according to the present disclosure.

Referring to FIG. 7, the battery including the polyurethane separator shows no CV peak under argon gas atmosphere, while it shows a reversible CV peak under oxygen gas atmosphere. This suggests that the polyurethane separator according to the present disclosure does not affect the main reaction of a lithium oxygen battery.

Referring to FIG. 8 and FIG. 9, it can be seen that a crystalline $Li_2O_2$ XRD peak appears on the surface of a cathode including carbon nanotubes after the first discharge, and then disappears after the first charge. It can be also seen that toroid-shaped $Li_2O_2$ having a size of 700 nm appears, and then disappears through the SEM image. This suggests that the battery including the polyurethane separator according to the present disclosure is driven reversibly during charge/discharge cycles.

As can be seen from the voltage profile and cycle characteristics of FIG. 10, the battery including a polyethylene separator shows a drop in capacity at the $54^{th}$ cycle under the constant-capacity driving condition of a current density of 200 mA $g^{-1}$ and a capacity of 600 mAh $g^{-1}$. On the contrary, the battery including the polyurethane separator retains its capacity to at least the $110^{th}$ cycle. The above results suggest that deterioration of lithium metal may be a main factor determining the lifespan of a lithium oxygen battery.

Figure 12:
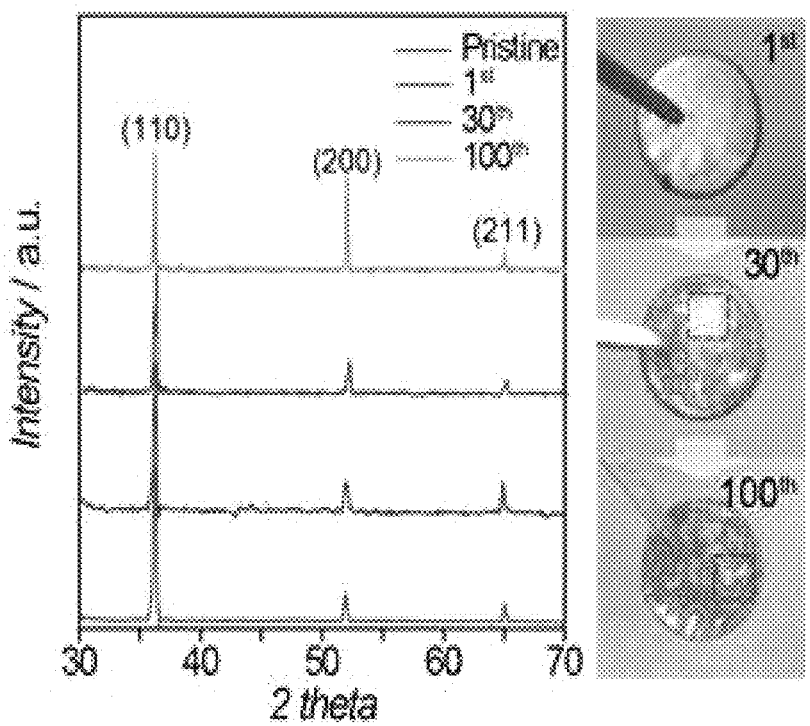

FIG. 11-FIG. 16 demonstrate the effect of a polyurethane separator upon protection of lithium metal. As shown in the XRD spectrum of FIG. 11, lithium metal in the battery including a polyethylene separator causes a phase transition into LiOH after the $70^{th}$ cycle, and then lithium metal into white. On the contrary, as can be seen from the XRD spectrum of FIG. 12 illustrating lithium metal of the battery including a polyurethane separator, lithium retains XRD peaks even after the $100^{th}$ cycle or more and maintains a color similar to its original color. This suggests that the polyurethane separator according to the present disclosure effectively prevents deterioration of lithium metal.

Figure 13:
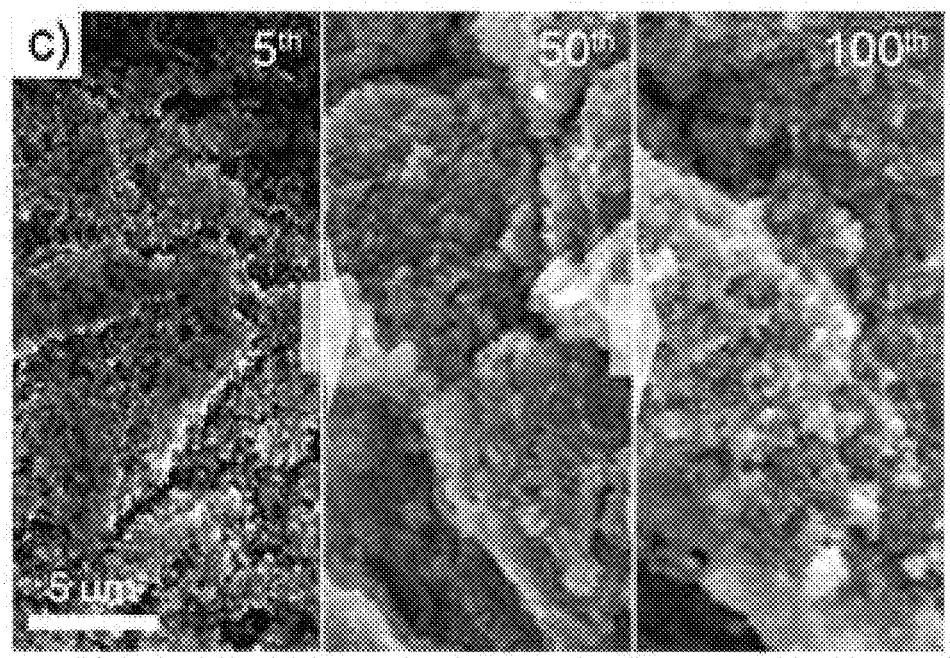
Figure 14:
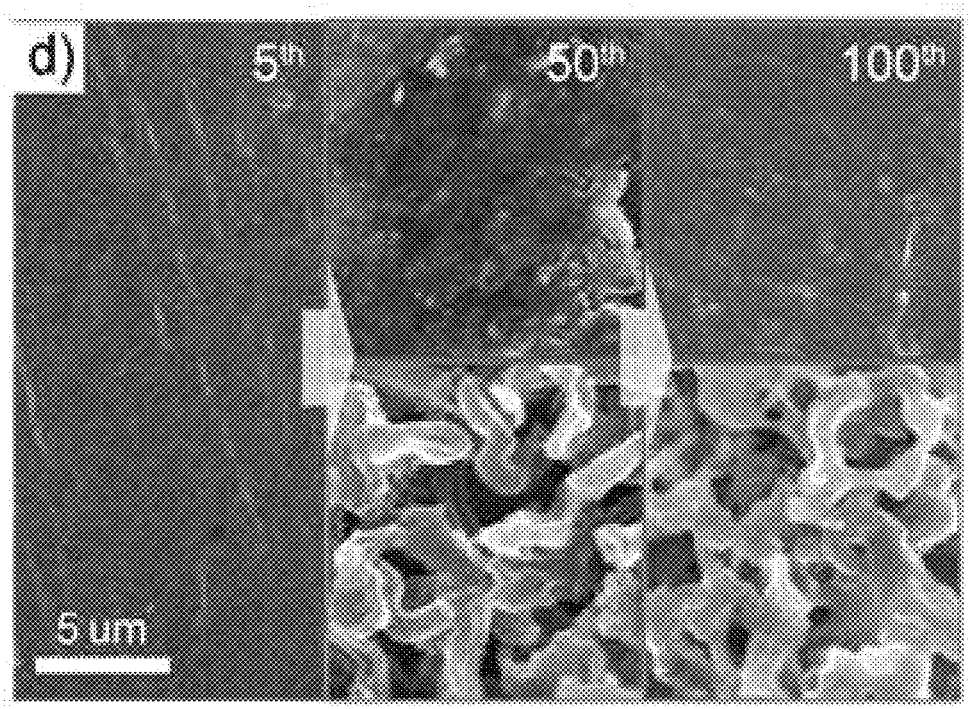
Figure 15:
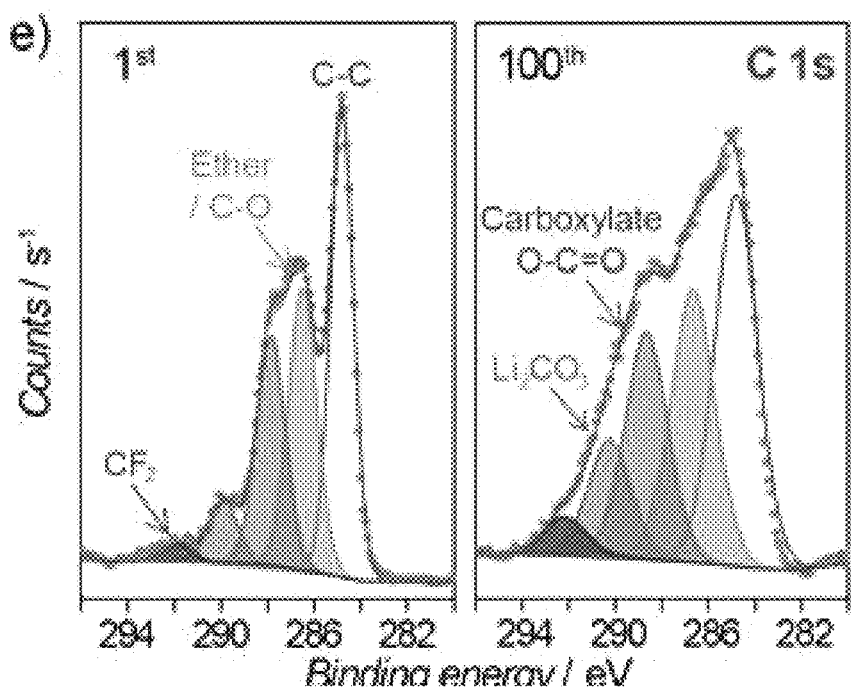

The results of SEM image analysis show a similar tendency. Referring to FIG. 13, in the case of the battery including a polyethylene separator, some particles estimated as LiOH are distributed on the lithium metal surface. On the contrary, in the case of the battery including the polyurethane separator as shown in FIG. 14, a small amount of dendrite is grown on the lithium metal surface, like a closed battery system. This suggests that lithium metal, in a lithium oxygen battery, behaves like a closed battery system by virtue of the polyurethane separator according to the present disclosure. This also demonstrates that growth of dendrite is inhibited as compared to a porous separator.

Figure 16:
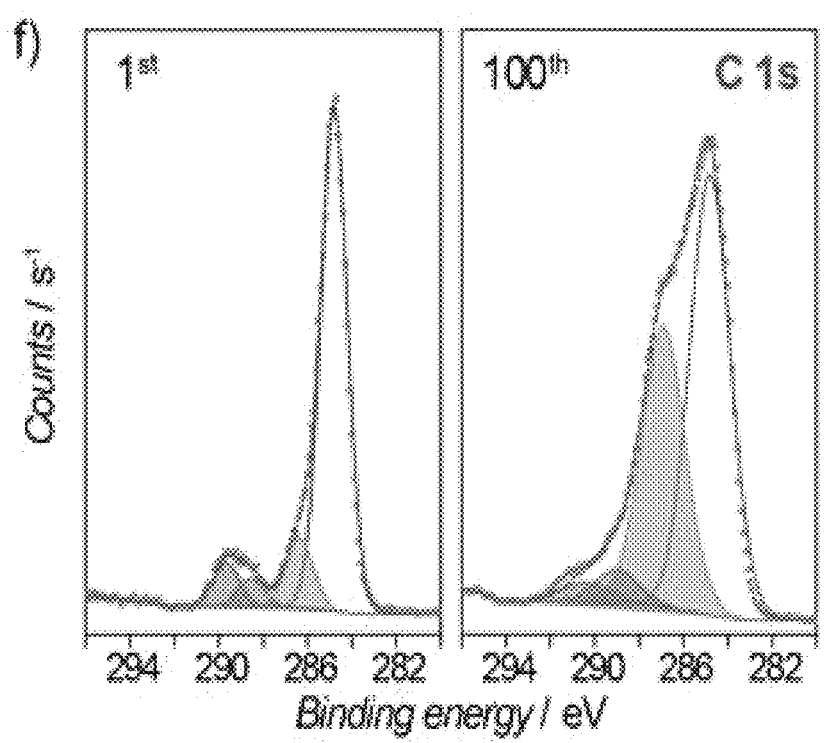

The results of lithium surface composition analysis show a similar tendency. Referring to the XPS surface analysis results of FIG. 15, in the case of the battery including a polyethylene separator, the peaks related with carbonate or carboxylate caused by decomposition of electrolyte and binder decomposition materials are increased as the number of cycles is increased. On the contrary, the battery including the polyurethane separator shows little decomposition materials on the lithium metal surface as shown in FIG. 16. This demonstrates that the polyurethane separator according to the present disclosure significantly improves the interfacial stability of lithium metal.

Figure 17:
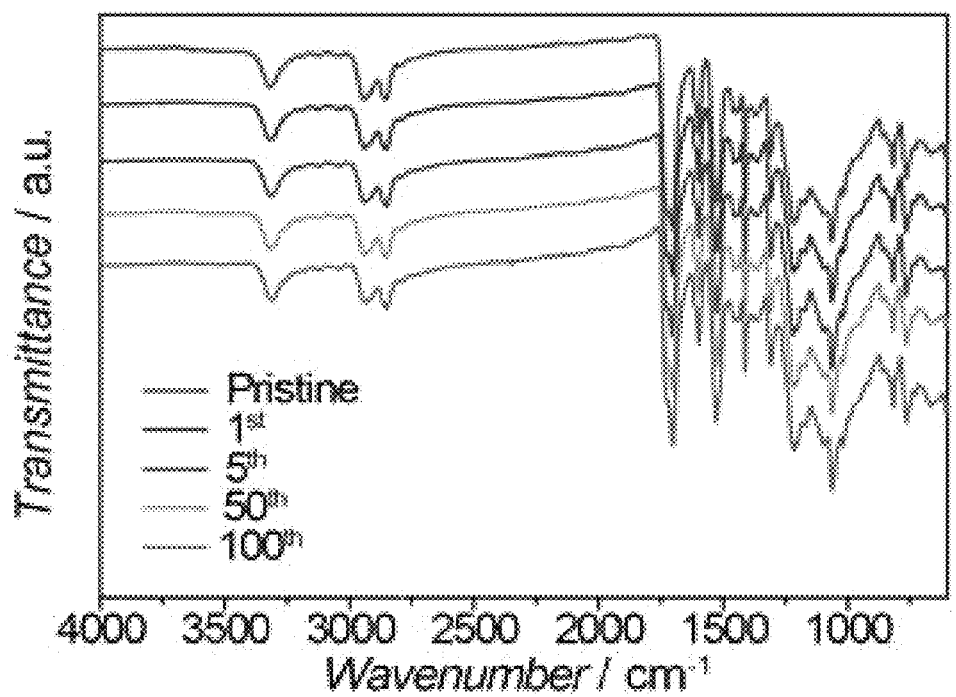
FIG. 17 shows the FT-IR analysis results of the polyurethane separator depending on cycles.
Figure 18:
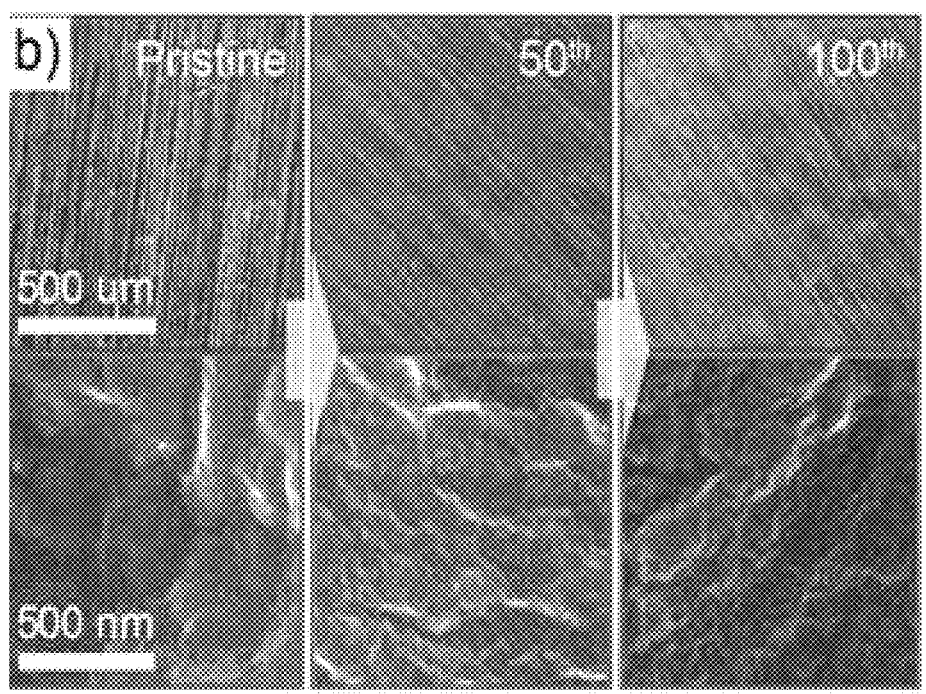
FIG. 18 shows the SEM analysis results of the polyurethane separator.

FIG. 17 shows the FT-IR analysis results of the polyurethane separator depending on cycles, and FIG. 18 shows the SEM analysis results of the polyurethane separator.

Referring to FIG. 17, even after a lithium oxygen battery is driven to the $100^{th}$ cycle, the FT-IR peaks of the polyurethane separator according to the present disclosure are retained with no change. In addition, the results of surface analysis based on SEM as shown in FIG. 18 show that the polyurethane separator according to the present disclosure maintains its shape well to the $100^{th}$ cycle. The above results demonstrate that the polyurethane separator according to the present disclosure is maintained stably without physicochemical deterioration under the driving condition of a lithium oxygen battery.

However, although lithium metal is protected stably by the polyurethane separator, the lifespan of a battery is degraded after the $110^{th}$ cycle, as can be seen from the analysis results of the cathode as shown in FIG. 19 through FIG. 22.

Figure 19:
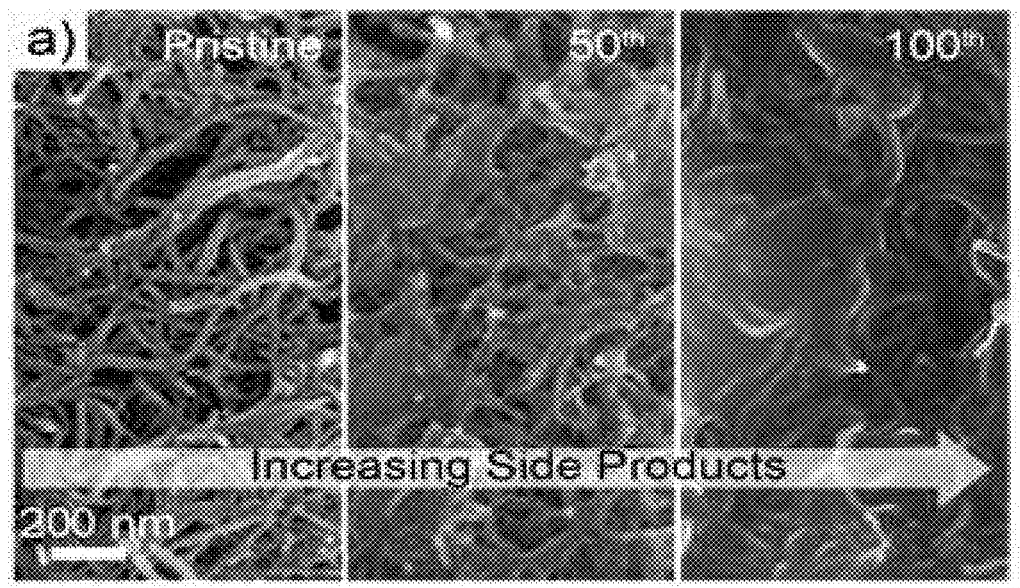
FIG. 19 through FIG. 22 show the analysis results of a cathode depending on cycles and the voltage profile and cycle characteristics of a lithium-oxygen battery including lithium after the $110^{th}$ cycle.
Figure 20:
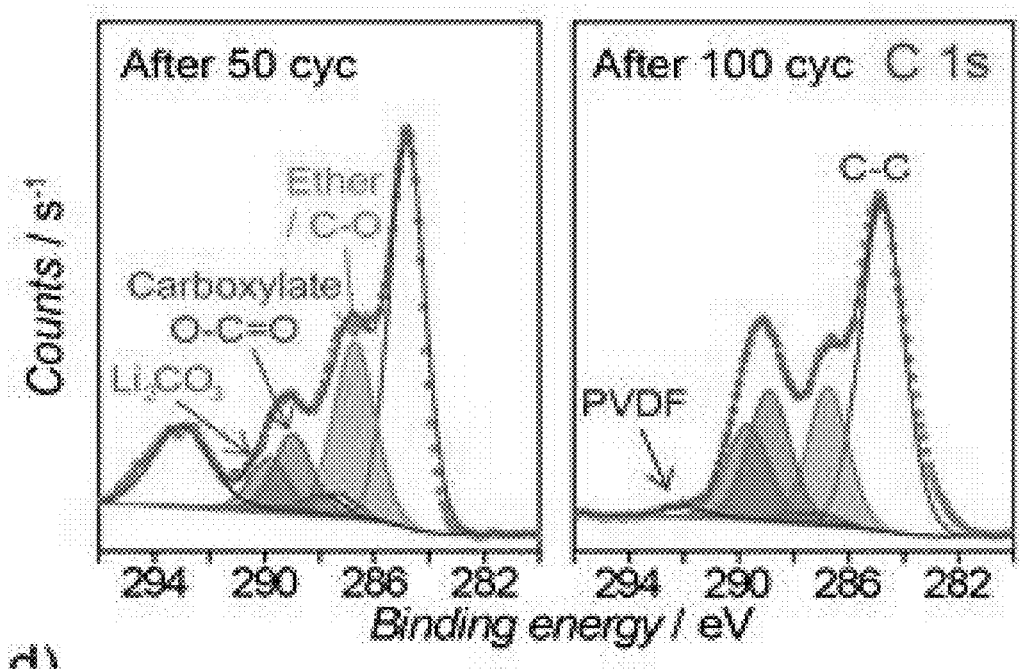
Figure 21:
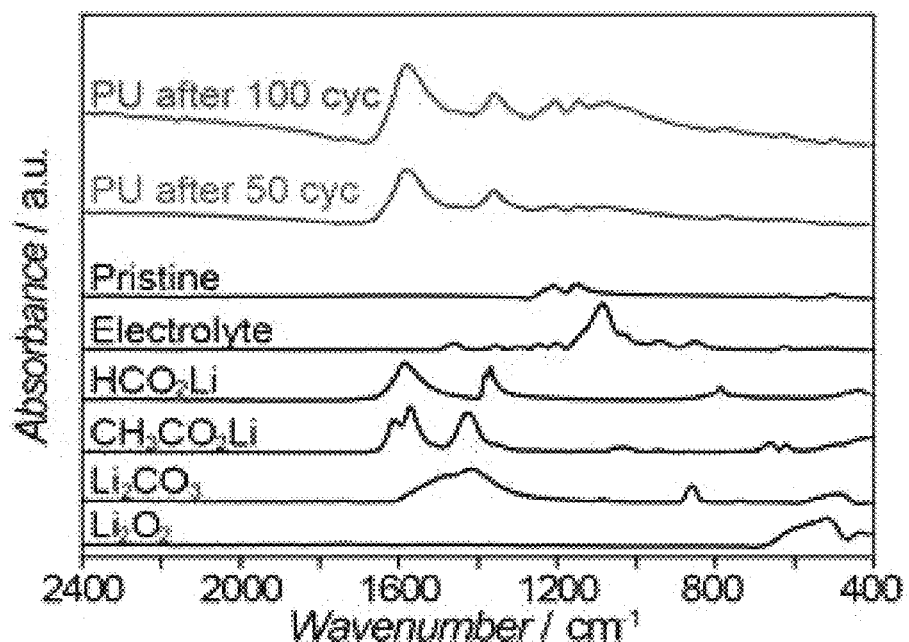

Referring to the SEM analysis results of the cathode surface depending on cycle number of the battery including a polyurethane separator as shown in FIG. 19, some materials are accumulated on the cathode surface as the number of cycles is increased. It can be seen from the XPS and FT-IR surface analysis of FIG. 20 and FIG. 21 that the materials are side reaction products, such as carbonate and carboxylate. Since such decomposition materials are accumulated on the cathode surface as the number of cycles is increased, the battery shows a drop in capacity after the $110^{th}$ cycle.

Figure 22:
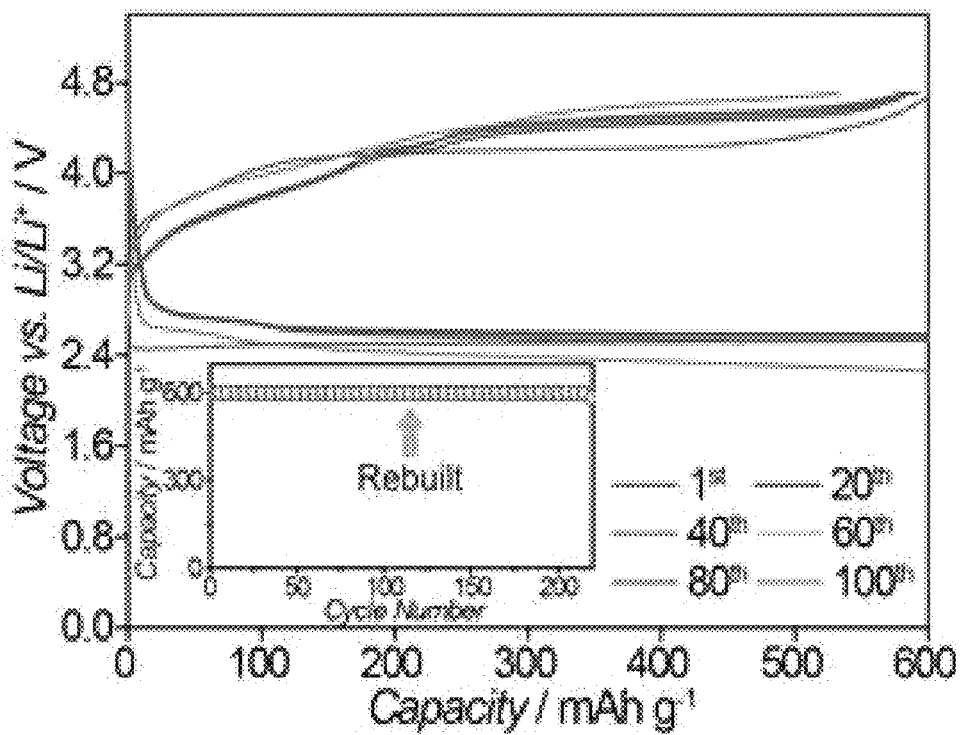

FIG. 22 shows the voltage profile and cycle characteristics of a lithium oxygen battery including lithium metal after the $110^{th}$ cycle. Even though a new battery is fabricated by using lithium metal that has been driven for 110 cycles, it can be seen from the results of FIG. 22 that the battery shows substantially the same voltage profile curve and cycle characteristics as the results of FIG. 10. This suggests that degradation of lifespan of the lithium oxygen battery including the polyurethane separator results from the cathode.

FIG. 23 through FIG. 28 shows the effect of protecting lithium metal of the polyurethane separator in a lithium-oxygen battery containing lithium iodide as a redox medium.

Figure 23:
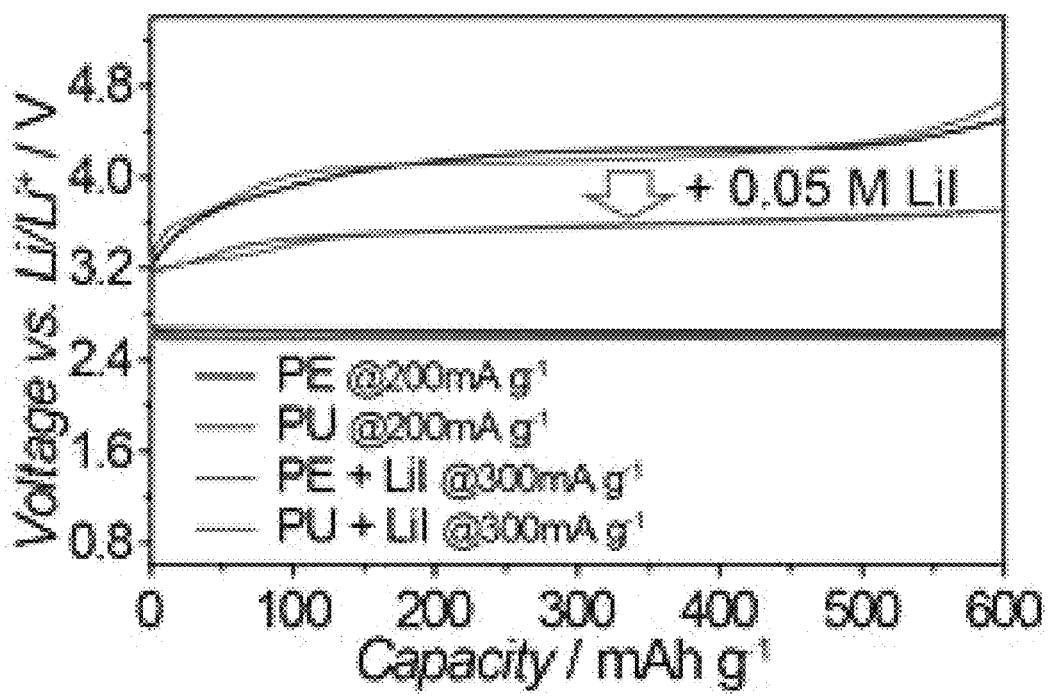
FIG. 23 through FIG. 28 shows the analysis results illustrating the effect of protecting lithium metal of the polyurethane separator in a lithium-oxygen battery containing lithium iodide as a redox medium.
Figure 24:
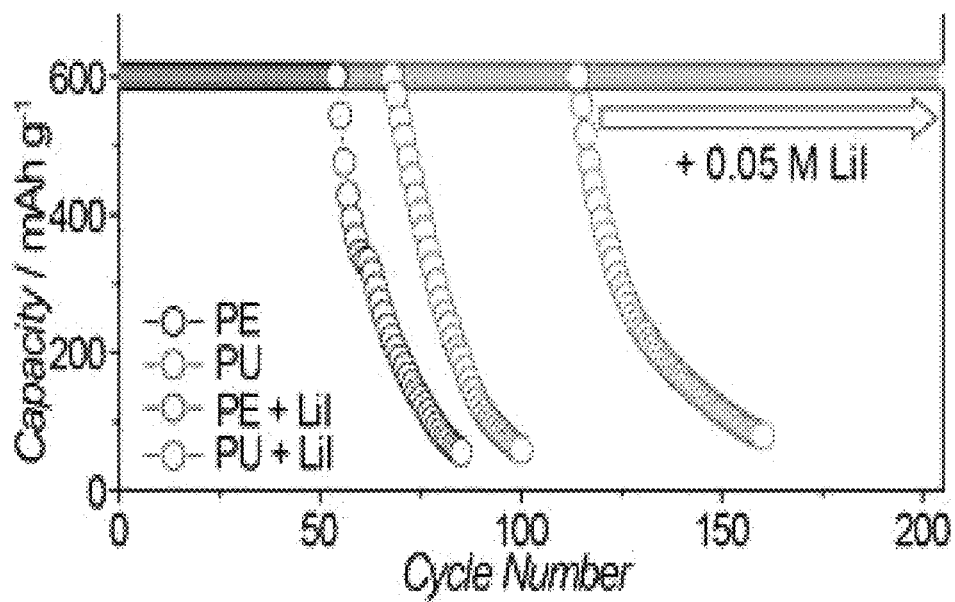

FIG. 23 shows the voltage profile results of the lithium oxygen battery including lithium iodide. Since lithium iodide functions as a redox medium, decomposition of the discharge product, $Li_2O_2$, is accelerated, resulting in a significant drop in overvoltage during charge. In addition, by virtue of the effect, the battery including the polyurethane separator according to the present disclosure retains capacity for at least 200 cycles as shown in FIG. 24. However, the battery including a polyethylene separator shows poor capacity retaining characteristics of 68 cycles.

Figure 25:
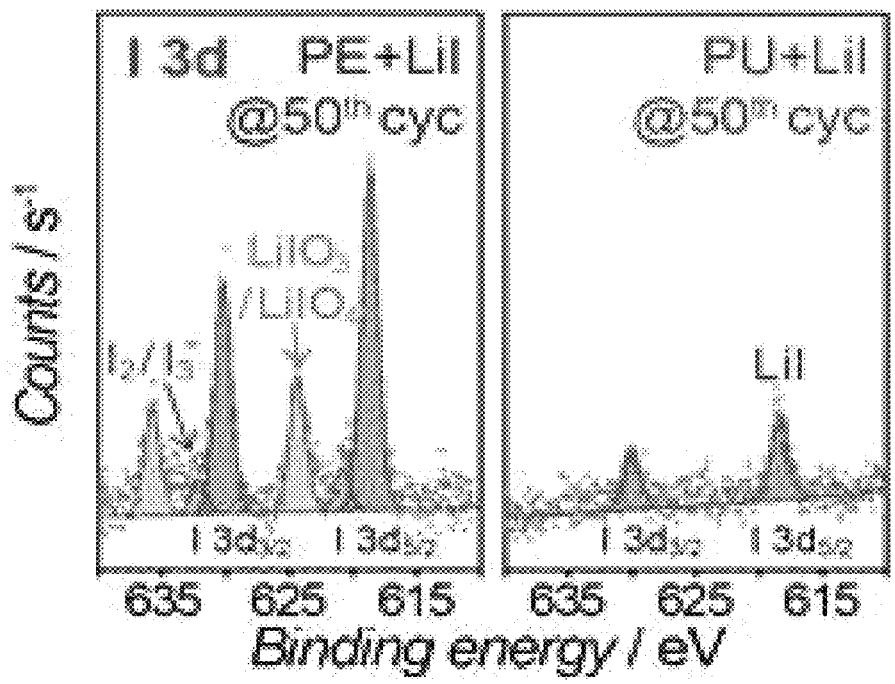
Figure 26:
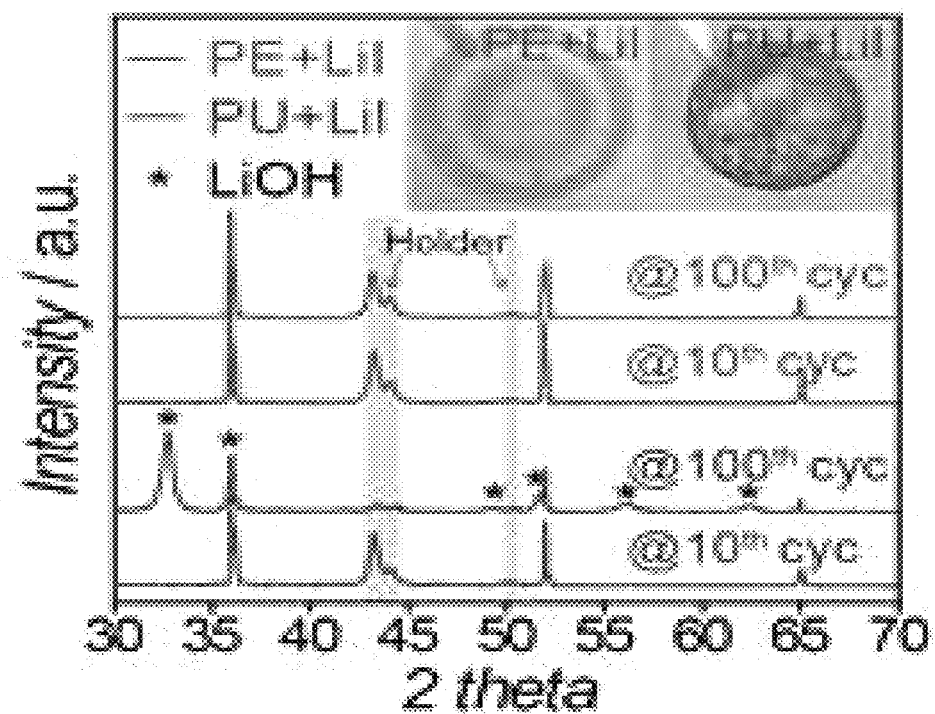
Figure 27:
Figure 28:
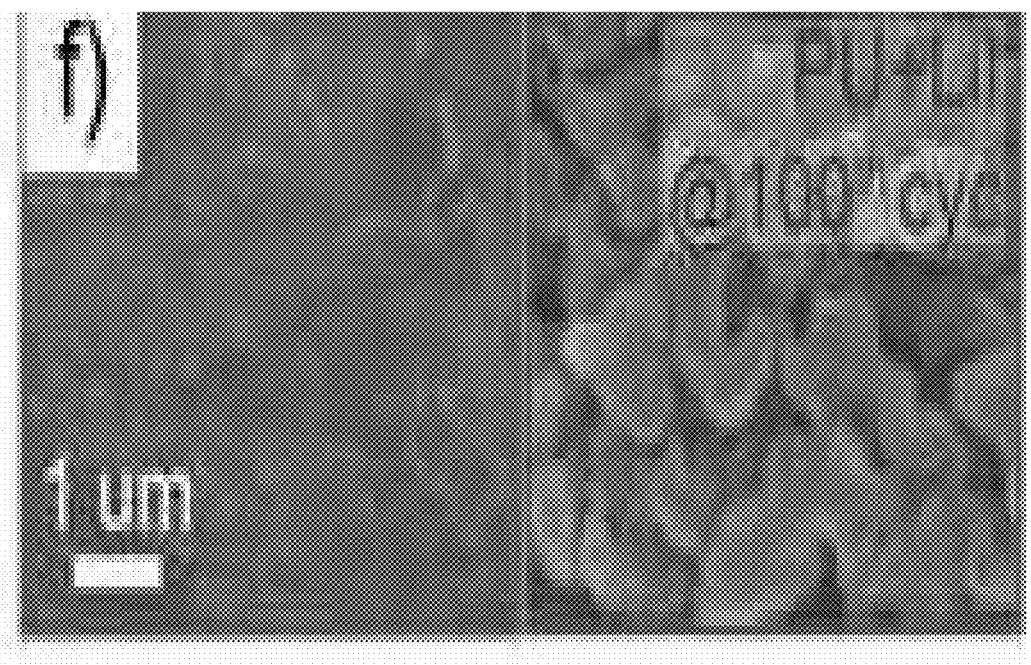

The I3d XPS surface analysis results of FIG. 25 show the reason why the battery including the polyurethane separator has improved lifespan characteristics. In the case of the battery including a polyethylene separator, low-conductivity ($<10^{-6}$ S/cm) iodate ($LiIO_3$ or $LiIO_4$) is formed on the lithium metal surface due to the reaction between oxygen and lithium iodide. However, in the case of the battery including the polyurethane separator, a clear surface having no such materials can be seen. In addition, the XRD and SEM analysis results of FIG. 26 through FIG. 28 coincide with the results of FIGS. 11-12 and FIGS. 13-14. This suggests that the battery including lithium iodide and the polyurethane separator can retain the characteristics unique to lithium to the $100^{th}$ cycle with no phase transition into LiOH. Thus, when the nonporous polyurethane separator is introduced, it is possible to inhibit side reactions caused by lithium iodide as a redox medium at the anode, and thus to improve the reversibility of the cathode and the reversibility of the lithium oxygen battery.

Figure 29:
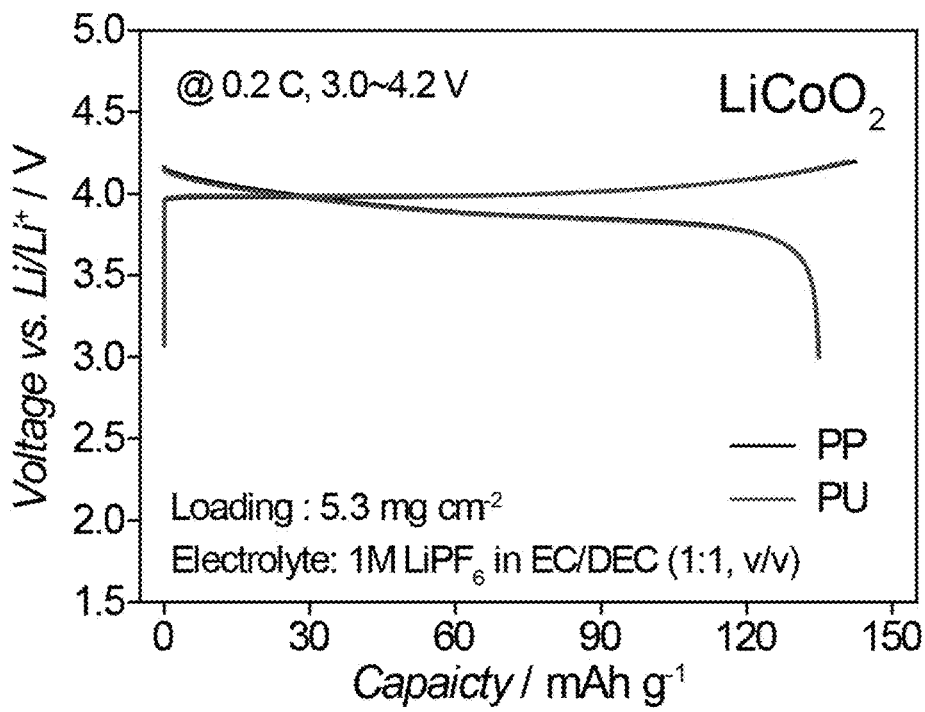
FIGS. 29 and 30 show the voltage profile results of the lithium ion battery including the polyurethane separator.
Figure 30:
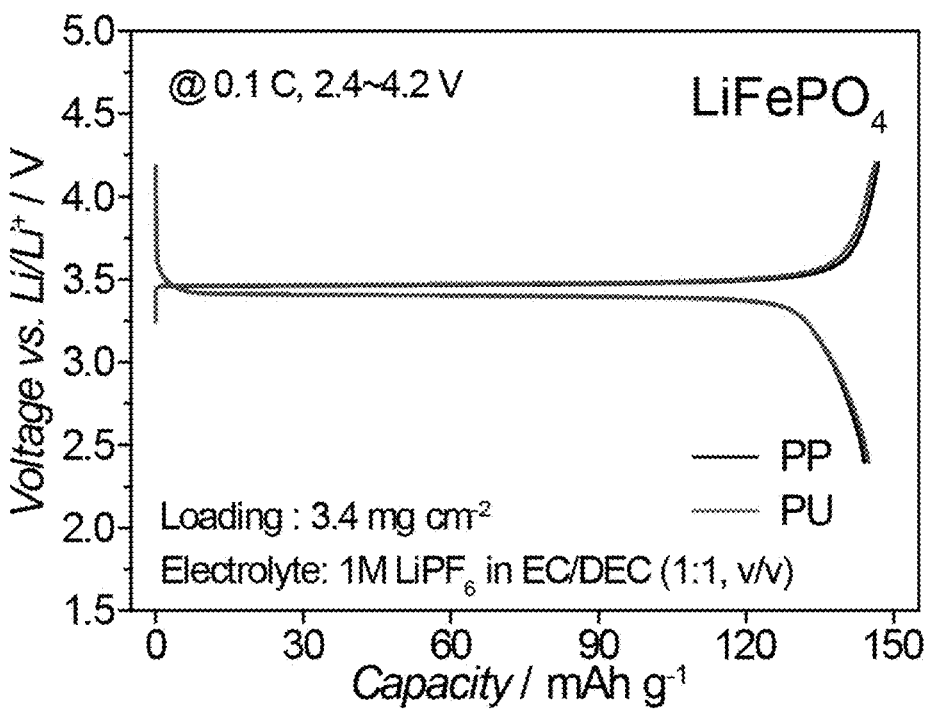

In addition, as can be seen from FIG. 29 and FIG. 30, the polyurethane separator may be applied to a lithium ion battery, besides a lithium oxygen battery.

FIG. 29 and FIG. 30 show the voltage profile results of the lithium ion battery including the polyurethane separator.

FIG. 29 and FIG. 30 show the voltage profile results of a battery using, as a cathode, lithium cobalt oxide ($LiCoO_2$, LCO) and lithium iron phosphate ($LiFePO_4$, LFP) including a polyurethane separator, and as an anode, lithium metal. In both cases, the voltage profile of the battery including polyurethane coincides with that of the battery including the conventional porous polyolefin-based separator. This suggests that the polyurethane separator may be driven stably even under the driving condition of a lithium secondary battery, while not significantly affecting the electrochemical characteristics of the battery.

Further, the nonporous polyurethane-based separator may be applied to a separator for a lithium-sulfur battery within the scope of the present disclosure. This will be described in more detail hereinafter.

A separator for a lithium-sulfur battery having non-porous property does not allow permeation of lithium polysulfides, while allowing transfer of lithium ions due to the electrolyte present in the interchain space of the separator polymer. In addition, the separator according to the present disclosure may inhibit growth of lithium metal on the lithium metal anode by virtue of its unique wetting property. When the separator according to the present disclosure is used in combination with not only cesium nitrate ($CsNO_3$) electrolyte additive but also a sulfur-carbon composite cathode, it shows high capacity and high cycle characteristics corresponding to 79.2% even after the $200^{th}$ cycle. Further, the nonporous separator according to the present disclosure solves the problem of thermal shrinkage of a porous polyolefin membrane, thereby increasing the stability of a battery. Hereinafter, the present disclosure will be explained in more detail with reference to Example and Test Example.

Example

First, c-PANS as an electrode material is prepared according to the known procedure. Briefly, 50 g of sulfur element (Aldrich) and 12.5 g of PAN (M.W.=150000, Aldrich) are mixed with each other by a ball mil process (300 rpm, 12 h), and the resultant mixture is fired in a tube furnace (450° C., 6 h, $N_2$ flows at 500 sccm, lapping rate=$10°$ C. $min^{-1}$). Elemental analysis of c-PANS reveals that the sulfur content is about 40 mass % (EA, Ondo Science). In the preparation of a sulfur electrode, c-PANS, denka black and SBR/CMC as a binder are dispersed in deionized water (8:1:1=W:W:W). The resultant slurry is cast onto nickel-coated polyester fibers by using the above-mentioned doctor blade process. Finally, the electrode is dried in a vacuum oven (80° C., 24 h). The mass loading of c-PANS in FIG. 44 was 8 mg $cm^{-2}$. The lithium metal anode surface-coated with $Li_xNO_y$ is obtained by carrying out coating through the immersion of lithium metal (Honjo Chemical Co., diameter=13 mm) in 5 mL of 0.3M $LiNO_3$ solution for 4 hours. To carry out electrochemical analysis of a lithium-sulfur battery, the c-PANS electrode, a separator (spandex film (available from Taekwang Industries, Co., Ltd.) or polyethylene film (available from SK innovation Co., Ltd.)) and lithium metal foil are assembled to a CR2-32-type coin electrode. Three types of electrolytes (1.5M LiTFI, 1M LiTFSI/0.15M $LiNO_3$ and 1M LiTFSI/0.1M $LiNO_3$/0.05M $CsNO_3$) are dissolved into a cosolvent of DOL/DME=1/1=v/v (PANAX ETEC, Korea).

Figure 31:
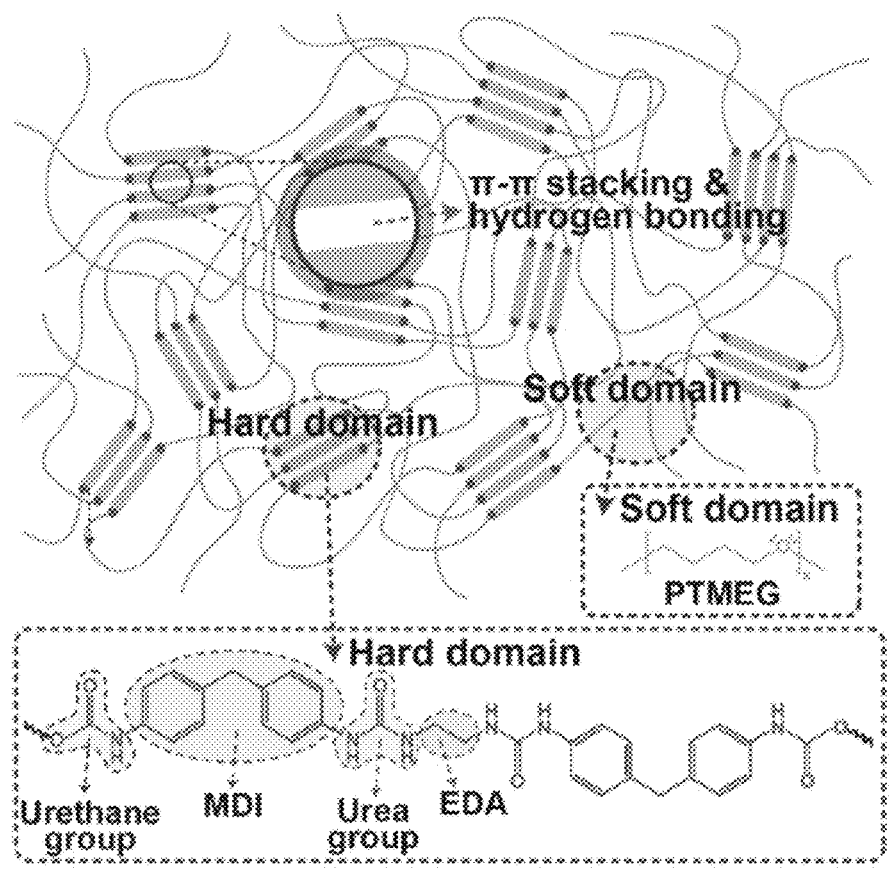
FIG. 31 shows the structure of the separator used in a lithium-sulfur battery according to an embodiment.

FIG. 31 shows the structure of the separator used in a lithium-sulfur battery according to an embodiment.

Referring to FIG. 31, the separator according to the present disclosure is divided into a hard domain and a soft domain, wherein the soft domain includes poly(tetramethylene ether) glycol (PTMEDG) units, and repeated methylene diphenyl diisocyanate (MDI) and ethylene diamine form the hard domain.

In the hard domain of the separator according to the present disclosure, there are π-π interactive between MDI units and hydrogen bonding between an urea group and an urethane group.

The separator according to the present disclosure maintains its mechanical rigidity through the interpolymeric interactions in the hard domain. In addition, such structural characteristics of the hard domain provide flexibility and self-supportability.

Further, the soft domain aligned in the extending direction allows physical elongation of the separator and the elongated separator can be restored by the interactions in the hard domain.

Figure 32:
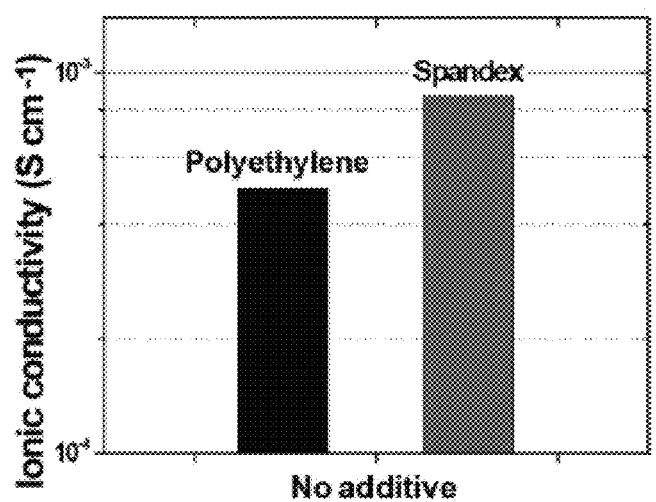
FIG. 32 shows the results of a comparative experiment for ion conductivity.

The separator for a lithium-sulfur battery according to the present disclosure has a substantially neglectable degree of porosity. In fact, the separator has an infinite Gurley time. Herein, Gurley time means the time required for 100 $cm^3$ of air to permeate through a separator under a pneumatic pressure of 0.862 kgf $cm^{-2}$. Nevertheless, the separator has an ion conductivity of $8.68 \times 10^{-4}$ S $cm^{-1}$ as determined by electrochemical impedance spectroscopy (EIS). Such an ion conductivity is significantly higher than that of a porous polyethylene separator, $4.95 \times 10^{-4}$ S $cm^{-1}$, under the same electrolyte condition (see, FIG. 32). FIG. 32 shows the results of a comparative experiment for ion conductivity.

Figure 33:
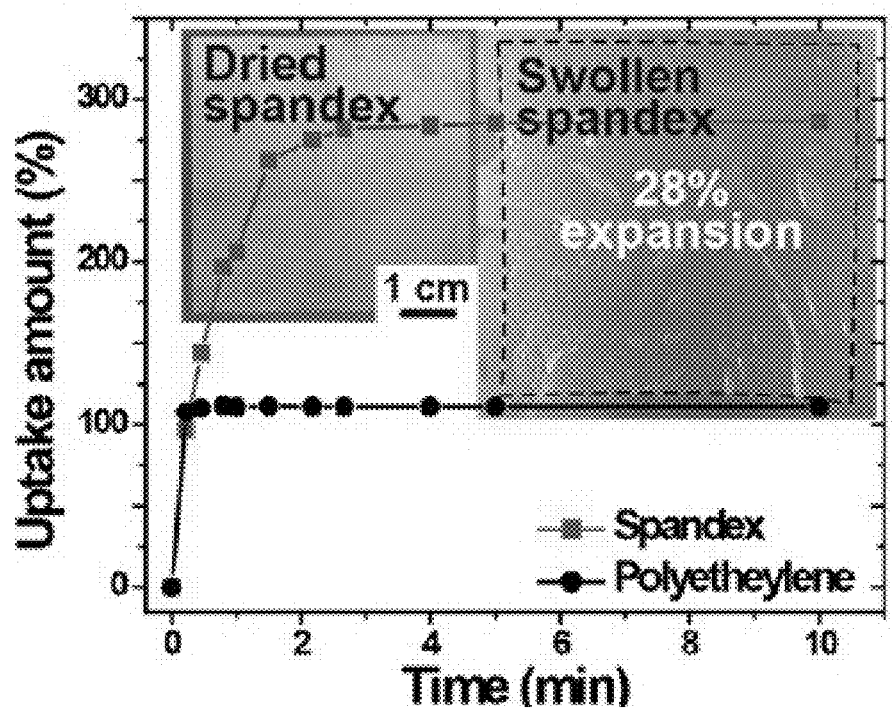
FIG. 33 shows the results of a comparative experiment for electrolyte uptake capability between the separator (spandex) according to the present disclosure and the conventional polyethylene separator.

This can be explained by excellent electrolyte uptake capability of the separator according to the present disclosure. FIG. 33 shows the results of a comparative experiment for electrolyte uptake capability between the separator (spandex) according to the present disclosure and the conventional polyethylene separator.

Referring to FIG. 33, while the electrolyte is absorbed, it is absorbed in the separator (spandex) according to the present disclosure at the same time due to the interaction between the electrolyte and a polar functional group (urethane, urea, ether). The spandex film separator according to the present disclosure shows a degree of swelling with electrolyte up to 28%. Therefore, lithium ions may be diffused through the electrolyte present in the interchain space. This suggests that the electrolyte-separator interaction plays an important role in diffusion of lithium ions. If the interaction is in a desired direction, lithium ion conductivity may be high even in a nonporous separator. Therefore, the nonporous separator according to the present disclosure is more suitable for a lithium-sulfur battery than the conventional porous separator having low wettability with electrolyte.

Figure 34:
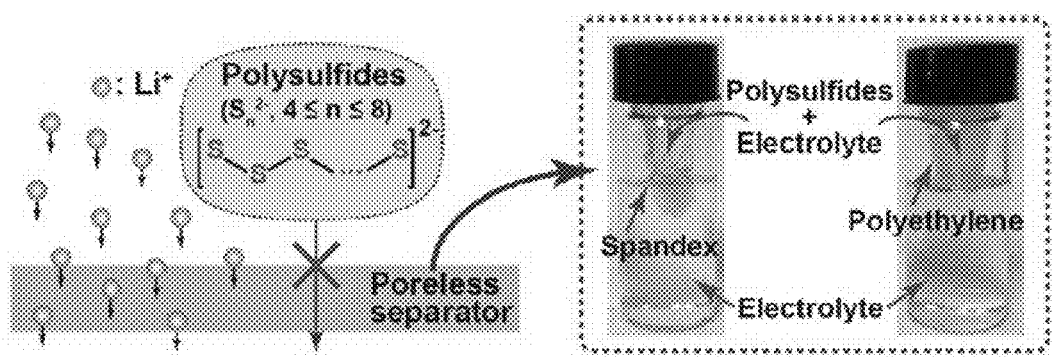
FIG. 34 is a schematic view illustrating the separator according to the present disclosure interrupting lithium polysulfides diffusion in a lithium-sulfur battery.

FIG. 34 is a schematic view illustrating the separator according to the present disclosure interrupting lithium polysulfides diffusion in a lithium-sulfur battery.

Referring to FIG. 34, the separator according to the present disclosure has an interchain distance of 2.8 Å and a porosity of 0. Therefore, it is actually impossible for polysulfide ions to permeate through the separator as can be seen from the test results shown in the right side of FIG. 34. It can be seen from the test results shown in the right side of FIG. 34 that the separator (spandex) according to the present disclosure substantially completely interrupts transfer of polysulfide, unlike the porous polyethylene separator.

Figure 35:
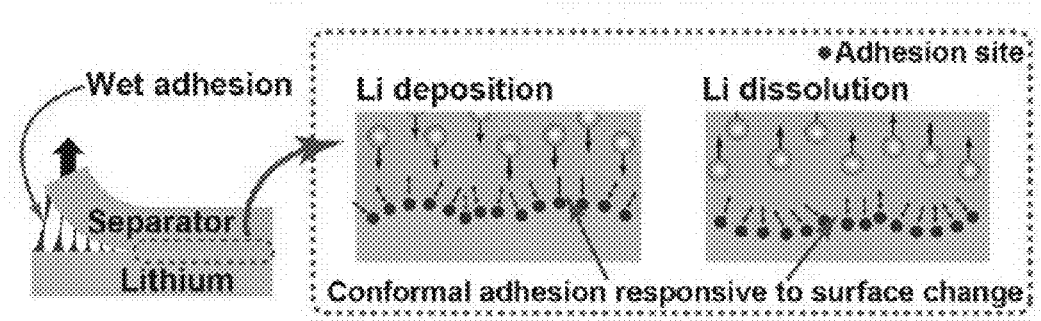
FIG. 35 is a schematic view illustrating the effect of the separator according to an embodiment depending on binding characteristics.

FIG. 35 is a schematic view illustrating the effect of the separator according to an embodiment depending on binding characteristics.

Referring to FIG. 35, excellent wet binding characteristics of the separator according to the present disclosure function as physical pressure on the lithium metal surface to reduce the surface tension of lithium metal, and thus to inhibit growth of lithium dendrite.

Figure 36:
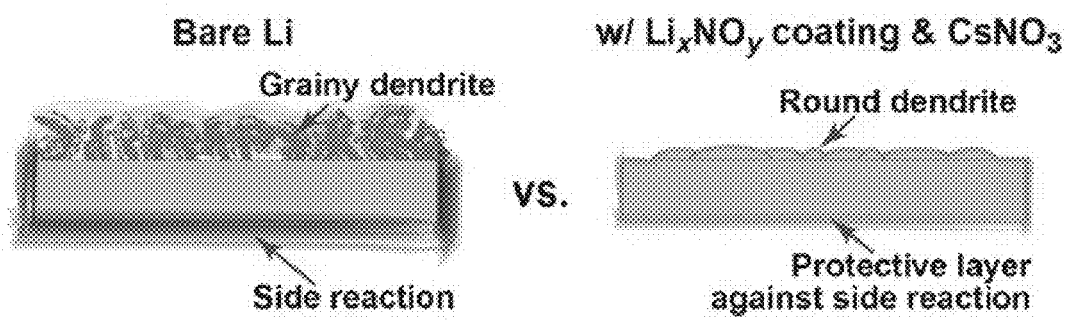
FIG. 36 is a schematic view illustrating the effect of the lithium metal electrode coating and electrolyte additives.

FIG. 36 is a schematic view illustrating the effect of the lithium metal electrode coating and electrolyte additives.

Referring to FIG. 36, the lithium metal electrode according to an embodiment is coated with a $Li_xNO_y$ layer and $CsNO_3$ is added to the electrolyte. The coating layer inhibits undesired side reactions on the lithium metal surface and the additive, $CsNO_3$, induces dendrite morphology into a round shape, and then inhibits the successive growth of lithium dendrite.

Figure 37:
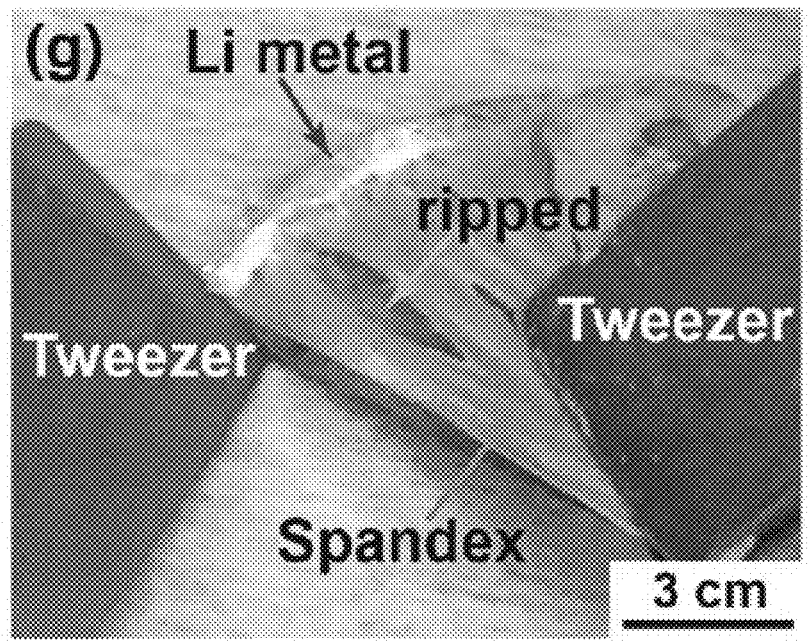
FIG. 37 shows the adhesion test results of the separator according to an embodiment.

As described above, the separator according to the present disclosure shows strong wet adhesion to lithium metal. When a separator wetted with electrolyte is assembled between copper foil and lithium foil of a coin cell, the separator according to the present disclosure is strongly adhered to lithium metal merely by a short lithium deposition process or under simple pressurization, and thus may not be removed easily even with tweezers. Rather, the separator film is removed partially in the form of dots at different positions. FIG. 37 shows the adhesion test results of the separator according to an embodiment.

Such strong adhesion force results from the $Li(\delta+)-O(\delta-)$ ion-dipole interaction between the carbonyl groups of the lithium ion-bound urethane and urea functional groups and oxygen ions on the partially oxidized lithium metal surface. On the contrary, the conventional polyethylene separator does not show the above-mentioned characteristics, since it has no charged atoms capable of ion-dipole interaction. As mentioned above, such strong adhesion force assists inhibition of lithium dendrite growth.

Further, the separator according to the present disclosure provides higher thermal safety as compared to the polyethylene separator having a relatively lower melting point (≤120° C.). This is because the separator according to the present disclosure includes bis-urea having a higher melting point (≤254° C.). In other words, the polymerized units in the hard domain of the separator according to the present disclosure preferably have a melting point of at least 120° C.-254° C.

Figure 38:
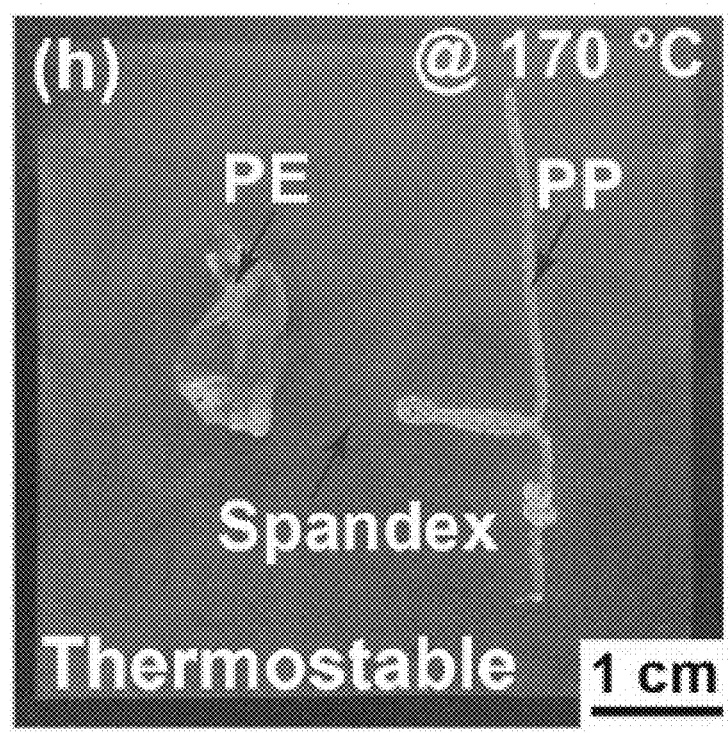
FIG. 38 shows the stability test results after heating at 170° C. for 1 hour.

FIG. 38 shows the stability test results after heating at 170° C. for 1 hour.

Referring to FIG. 38, the separator according to the present disclosure shows no thermal shrinkage even at high temperature. However, porous polyethylene and polypropylene separators show severe thermal shrinkage.

As described above, excellent characteristics of a lithium-sulfur battery depend on the stable interface of a lithium metal anode. Before testing the effect of the lithium-sulfur battery including the separator according to the present disclosure, the lithium metal anode is optimized. To carry out such optimization, Li metal is coated with $Li_xNO_y$ and $CsNO_3$ is added to the electrolyte.

Figure 39:
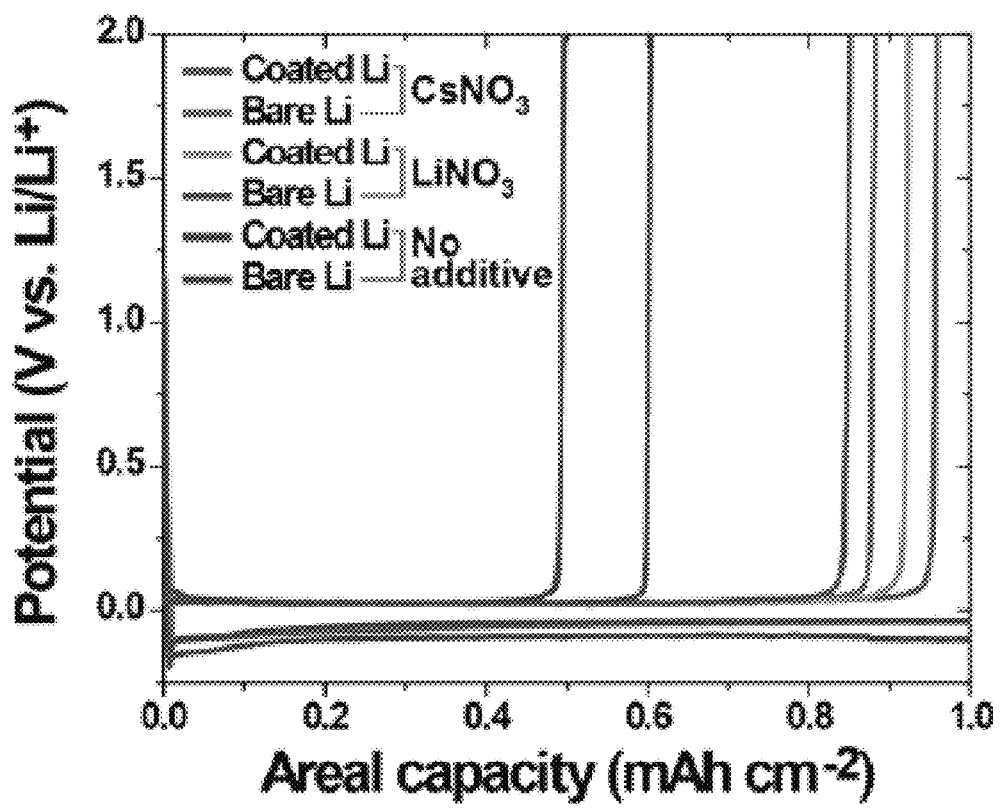
FIGS. 39 and 40 show the test results illustrating coulombic efficiency (CE) depending on the coating according to the present disclosure and the use of additives, respectively.
Figure 40:
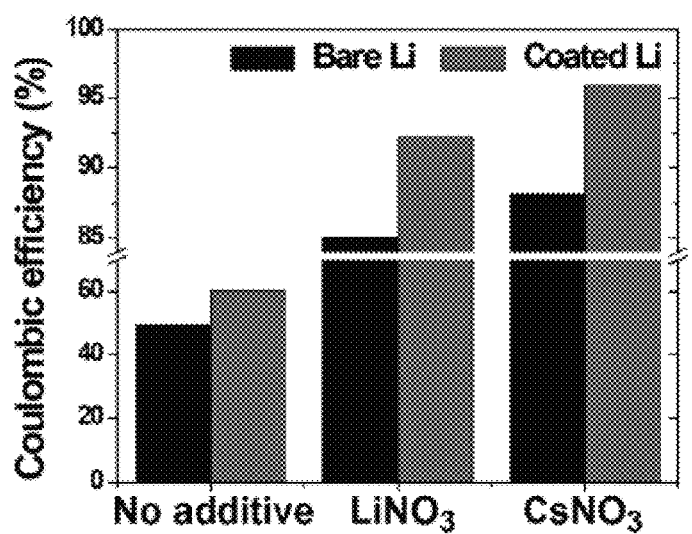

FIG. 39 and FIG. 40 show the test results illustrating coulombic efficiency (CE) depending on the coating according to the present disclosure and the use of an additive, respectively.

Referring to FIG. 39 and FIG. 40, a synergic effect is shown in CE as a result of the surface coating and use of an electrolyte additive. In other words, when such treatment is carried out, coulombic efficiency reaches 95.9%. However, Coulomb efficiency is merely 49.6%, when such treatment is not carried out. When any one of the surface coating and additive is used, a medium level of CE is shown.

Figure 41:
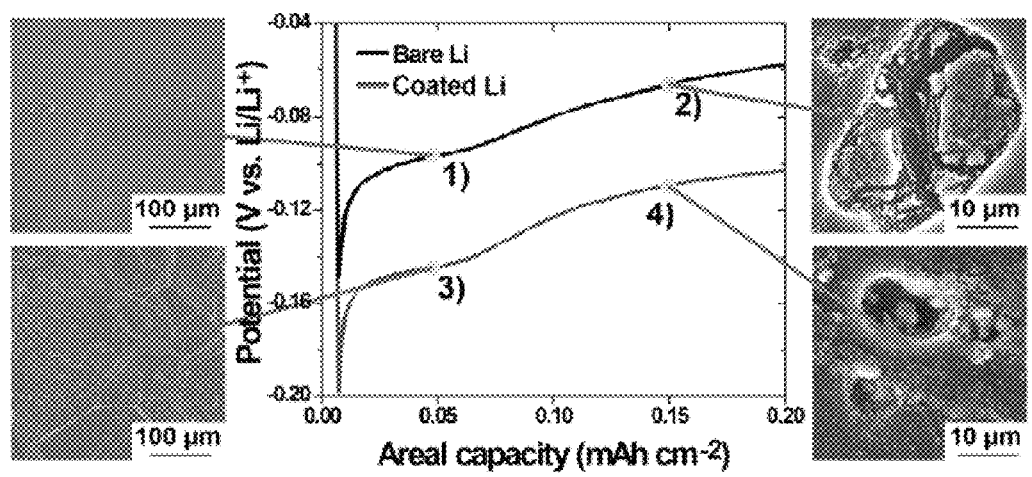
FIG. 41 shows the results of SEM morphology analysis of a coated lithium electrode and a bare electrode at the initial discharge.

FIG. 41 shows the results of SEM morphology analysis of a coated lithium electrode and a bare electrode at the initial discharge.

Referring to FIG. 41, when no surface coating is used, lithium dissolution from the lithium metal anode does not occur upon the first discharge due to the surface side reaction. Actual dissolution of lithium ions from the lithium metal surface is detected from a change in morphology in the SEM image. In other words, when discharge further proceeds, a morphological change, such as formation of a local puddle, occurs. This means non-uniform Li deposition/dissolution, resulting in degradation of the efficiency of a battery.

Figure 42:
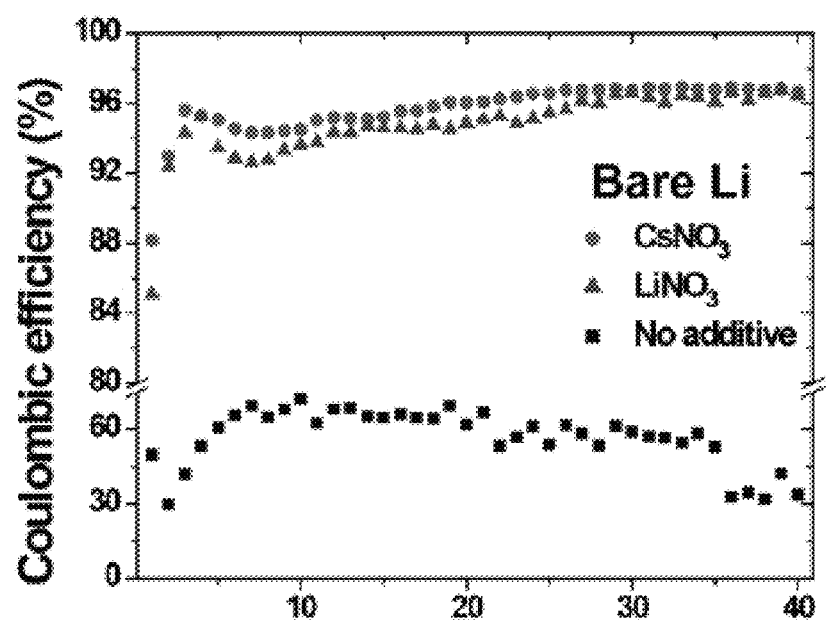
FIGS. 42 and 43 shows the CE test results of the bare electrode and the coated electrode, respectively, depending on electrolyte condition.
Figure 43:
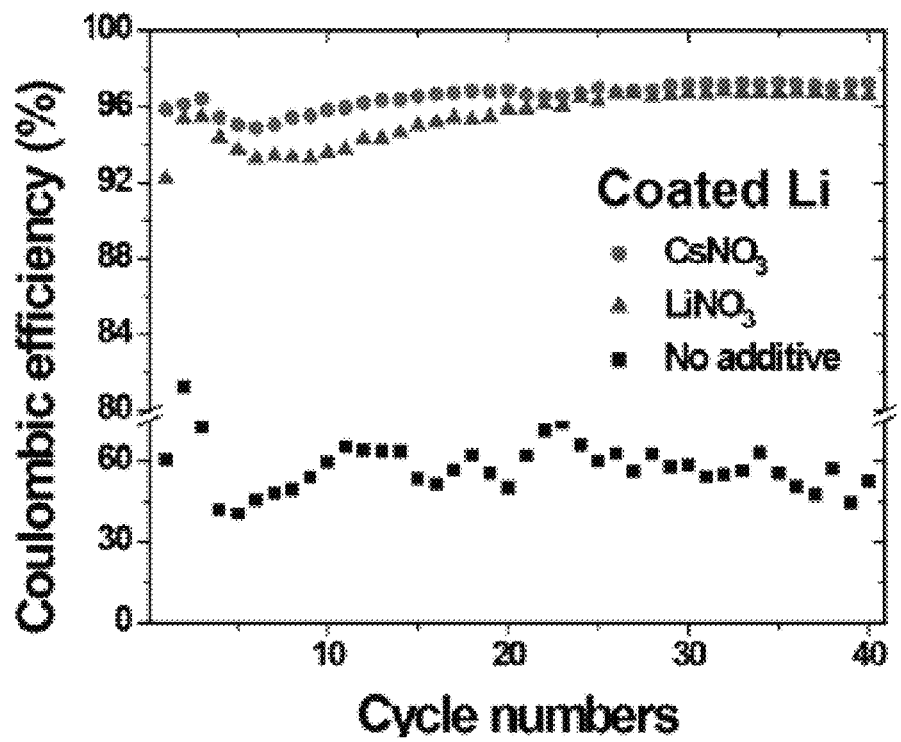

FIG. 42 and FIG. 43 shows the CE test results of the bare electrode and the coated electrode, respectively, depending on electrolyte condition.

Referring to FIG. 42 and FIG. 43, two types of additives are effective for inhibiting lithium dendrite growth but $Cs^+$ is more effective.

According to an embodiment, a carbon-sulfur composite material (c-PANS) obtained by the pyrolysis of elemental sulfur and polyacrylonitrile is used as a sulfur electrode.

Figure 44:
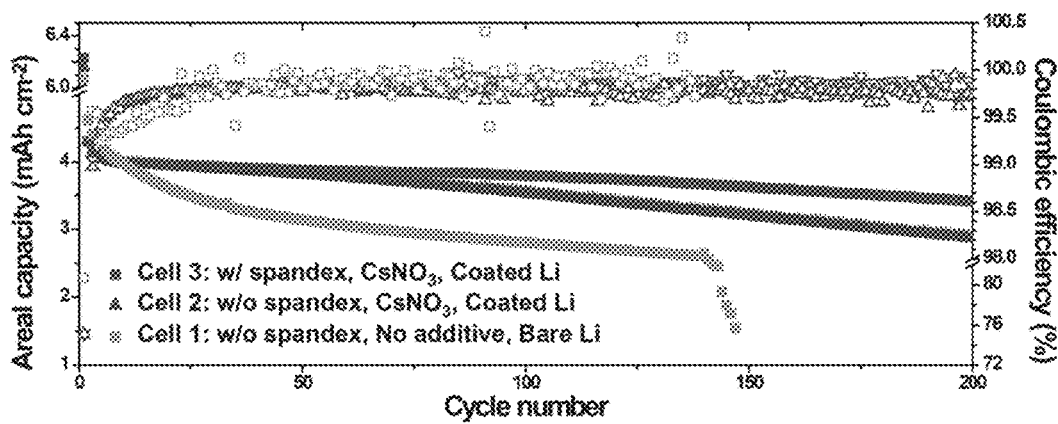
FIG. 44 shows the analysis results for different electrodes, electrolytes, and separators.

FIG. 44 shows the electrochemical results for different electrodes, electrolytes, and separators.

Referring to FIG. 44, Cell 1 shows a constant drop in capacity from the first cycle and its operation is stopped at the $147^{th}$ cycle. Cell 1 also shows unstable CE and reaches a CE exceeding 100% due to lithium dendrite. In other words, lithium dendrite results in severe decomposition of electrolyte, thereby making charge capacity larger than discharge capacity.

Cell 2 shows significantly improved quality in terms of cycle period and CE. After the 200$^{th}$ cycle, Cell 2 maintains its capacity to 66.8% and the average CE for the 2$^{nd}$ cycle to the 200$^{th}$ cycle is 99.7%. This suggests that Cs+ and NO$_3^-$ stabilize the lithium metal interface. Meanwhile, since the same sulfur electrode is used, it is thought that such a difference may result from electrolyte and electrode coating.

Cell 3 shows more improved results and maintains its capacity to 79.2% after the 200$^{th}$ cycle. Cell 3 has an average CE of 99.8% for the 2$^{nd}$ cycle to the 200$^{th}$ cycle. It is though that such results are based on strong adhesion force of the separator according to the present disclosure and nonporous characteristics thereof interrupting polysulfide diffusion.

Figure 45:
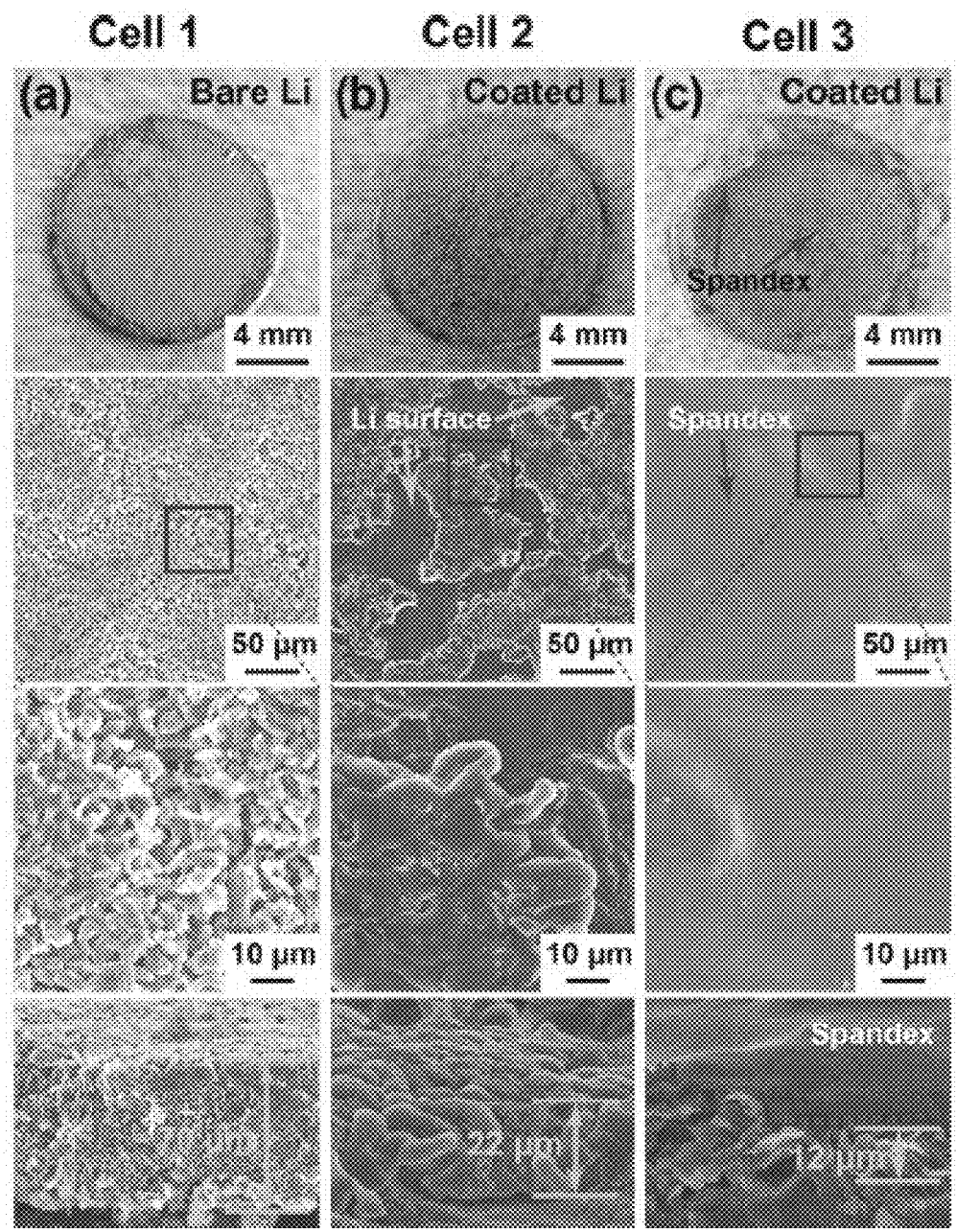
FIG. 45 shows the plan view and sectional view of each of the lithium metal anodes of Cell 1, 2 and 3 of FIG. 44 after 5 charge/discharge cycles In the following description, the same or similar elements are labeled with the same or similar reference numbers.

FIG. 45 shows the plan view and sectional view of each of the lithium metal anodes of Cell 1, 2, and 3 of FIG. 44 after 5 charge/discharge cycles.

Referring to FIG. 45, it can be seen that lithium dendrite is grown severely in Cell 1. In Cell 2, lithium dendrite is grown in a relatively smaller amount in a circular shape. Pure lithium surfaces are often observed between lithium dendrites (yellow arrow marks). However, in the case of Cell 3, it can be seen that Cell 3 using the nonporous separator that has strong adhesion force and interrupts polysulfide diffusion according to the present disclosure shows a decrease in lithium dendrite growth as compared to Cell 2. Cell 1, 2 and 3 have a lithium dendrite thickness of 70, 22 and 12 μm, respectively, as determined from the cross-sectional views.

As can be seen from the foregoing, the separator having nonporous characteristics, allowing permeation of desired ions only and interrupting permeation of undesired materials according to the present disclosure may be applied to all types of lithium batteries.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A lithium-sulfur battery comprising a separator for a lithium-sulfur battery,
   wherein the separator is divided into a hard domain comprising ethylene diamine and 4,4-diphenylmethane diisocyanate (MDI) and a soft domain comprising polytetramethylene glycol (PTEMG) and polyethylene oxide (PEO), is free from pores, and has an interchain distance of 2.8 Å or less,
   wherein a molar ratio of MDI:PTEMG:PEO is about 4:1:1.

2. The lithium-sulfur battery of claim 1, wherein the lithium-sulfur battery comprises electrolyte containing Cs+ as an additive.

3. The lithium-sulfur battery of claim 1, wherein the hard domain has higher mechanical rigidity than the soft domain.

4. The lithium-sulfur battery of claim 1, wherein the lithium-sulfur battery comprises a lithium electrode coated with LiNO$_3$.

* * * * *